US010602241B2

(12) United States Patent
Liu et al.

(10) Patent No.: US 10,602,241 B2
(45) Date of Patent: Mar. 24, 2020

(54) METHOD, SYSTEM NETWORK AND COMPUTER-READABLE MEDIA FOR CONTROLLING OUTGOING TELEPHONY CALLS TO CAUSE INITIATION OF CALL FEATURES

(75) Inventors: Gao Feng Liu, Ottawa (CA); David William Clark, Carp (CA); Jonathan Allan Arsenault, Orleans (CA); Eric John Wolf, Stittsville (CA)

(73) Assignee: BCE Inc., Verdun (CA)

( * ) Notice: Subject to any disclaimer, the term of this patent is extended or adjusted under 35 U.S.C. 154(b) by 1546 days.

(21) Appl. No.: 12/651,073

(22) Filed: Dec. 31, 2009

(65) Prior Publication Data

US 2011/0158223 A1    Jun. 30, 2011

(51) Int. Cl.
*H04Q 3/00* (2006.01)
*H04M 3/42* (2006.01)
(Continued)

(52) U.S. Cl.
CPC ....... *H04Q 3/0045* (2013.01); *H04L 65/1006* (2013.01); *H04M 3/42* (2013.01); *H04M 7/127* (2013.01)

(58) Field of Classification Search
CPC .... H04M 2207/12; H04M 3/436; H04M 3/42; H04M 3/4228; H04M 7/006;
(Continued)

(56) References Cited

U.S. PATENT DOCUMENTS

| 4,811,382 A | 3/1989 | Sleevi |
| 5,321,740 A | 6/1994 | Gregorek et al. |

(Continued)

FOREIGN PATENT DOCUMENTS

| WO | WO-2005/048571 A2 | 5/2005 |
| WO | WO-2007/060227 A2 | 5/2007 |

(Continued)

OTHER PUBLICATIONS

Written Opinion of the International Searching Authority and International Search Report dated Apr. 29, 2011 in connection with PCT patent application PCT/CA2010/002078.
(Continued)

*Primary Examiner* — Asad M Nawaz
*Assistant Examiner* — Najeeb Ansari
(74) *Attorney, Agent, or Firm* — Sean Murray; Murray IP Consulting Inc.

(57) ABSTRACT

The present invention discloses numerous implementations for IP-based call processing systems that can selectively control an outgoing call initiated by a source device to a destination device. The call processing system causes a Service Switching Point (SSP) associated with the source device to initiate a media connection between the IP-based call processing system and the source device. The call processing system further causes initiation of a call feature for the outgoing call using the media connection with the source device. The call feature may include a call restriction feature, a call feature for conveying an audio element to the source device, a call record feature and a call feature for conveying information to the source device. The call processing system further causes establishment of a media connection between the source and the destination devices.

71 Claims, 18 Drawing Sheets

(51) Int. Cl.
*H04L 29/06* (2006.01)
*H04M 7/12* (2006.01)

(58) Field of Classification Search
CPC ......... H04M 3/42059; H04M 3/42229; H04M 3/42348; H04M 3/493; H04M 3/42068; H04M 3/42153; H04M 7/127; H04M 15/56; H04M 15/61; H04M 7/126–127; H04M 15/90; H04M 7/066; H04M 7/06; H04M 3/42042; H04M 15/63; H04M 7/00; H04M 3/42017; H04L 65/1069; H04L 29/06027; H04Q 3/0025; H04Q 3/0029; H04Q 2213/13345
USPC .............................................. 370/352; 726/1
See application file for complete search history.

(56) References Cited

U.S. PATENT DOCUMENTS

| | | |
|---|---|---|
| 7,006,608 B2 | 2/2006 | Seelig et al. |
| 7,031,453 B1 | 4/2006 | Busardo |
| 7,076,445 B1 | 7/2006 | Cartwright |
| 7,127,238 B2 | 10/2006 | Vandermeijden et al. |
| 7,212,520 B2 | 5/2007 | Luciano, III |
| 7,360,090 B1 | 4/2008 | Doskow et al. |
| 7,426,266 B1* | 9/2008 | Roberts et al. .......... 379/215.01 |
| 7,474,432 B1 | 1/2009 | Kirchhoff et al. |
| 7,512,421 B2 | 3/2009 | Kim et al. |
| 7,616,954 B2 | 11/2009 | Jiang |
| 8,107,614 B2 | 1/2012 | Sobti et al. |
| 8,126,126 B2 | 2/2012 | Haley et al. |
| 8,126,456 B2 | 2/2012 | Lotter et al. |
| 8,130,930 B2 | 3/2012 | Dement |
| 8,134,920 B2 | 3/2012 | Imajuku et al. |
| 8,150,024 B1 | 4/2012 | Martin et al. |
| 8,150,025 B2 | 4/2012 | Koser et al. |
| 8,155,293 B2* | 4/2012 | Tiliks et al. .................. 379/196 |
| 8,194,849 B2 | 6/2012 | Bosan et al. |
| 2002/0075881 A1* | 6/2002 | Yoakum ................ H04M 7/127 370/410 |
| 2003/0036376 A1* | 2/2003 | Annan et al. ................. 455/406 |
| 2003/0076815 A1* | 4/2003 | Miller ................... H04L 49/602 370/352 |
| 2003/0147522 A1 | 8/2003 | Elazar |
| 2004/0008621 A1 | 1/2004 | Yaker |
| 2005/0018659 A1 | 1/2005 | Gallant et al. |
| 2005/0175161 A1 | 8/2005 | Reynolds et al. |
| 2006/0023862 A1 | 2/2006 | Sutcliffe |
| 2006/0083364 A1 | 4/2006 | Bossemeyer et al. |
| 2006/0095575 A1* | 5/2006 | Sureka et al. ................. 709/227 |
| 2006/0109969 A1 | 5/2006 | Oh |
| 2006/0280165 A1* | 12/2006 | Blumenschein et al. ..... 370/352 |
| 2007/0019633 A1* | 1/2007 | Tomar et al. ................. 370/352 |
| 2007/0064886 A1* | 3/2007 | Chiu et al. ................. 379/88.17 |
| 2007/0077918 A1 | 4/2007 | Nguyen et al. |
| 2007/0116221 A1 | 5/2007 | Kim |
| 2007/0121914 A1* | 5/2007 | Pearson et al. .......... 379/355.07 |
| 2007/0154004 A1* | 7/2007 | Daigle ..................... 379/211.04 |
| 2007/0189497 A1 | 8/2007 | Bareis |
| 2007/0201451 A1 | 8/2007 | Bennett |
| 2007/0206747 A1* | 9/2007 | Gruchala et al. ........ 379/142.01 |
| 2007/0209061 A1* | 9/2007 | Dekeyzer .......... H04L 29/12009 726/3 |
| 2008/0022014 A1* | 1/2008 | Peters et al. .................. 709/246 |
| 2008/0037740 A1 | 2/2008 | Yoakum et al. |
| 2008/0051068 A1 | 2/2008 | Frew et al. |
| 2008/0052206 A1* | 2/2008 | Edwards et al. ................. 705/34 |
| 2008/0130628 A1* | 6/2008 | Lin ........................ H04L 12/66 370/352 |
| 2008/0130841 A1 | 6/2008 | Pan et al. |
| 2008/0159522 A1 | 7/2008 | Ericson |
| 2008/0220813 A1 | 9/2008 | Brown et al. |
| 2008/0260119 A1 | 10/2008 | Marathe et al. |
| 2008/0311888 A1* | 12/2008 | Ku ....................... H04M 7/0024 455/414.1 |
| 2009/0022141 A1 | 1/2009 | Delmorme et al. |
| 2009/0022283 A1 | 1/2009 | Pollitt |
| 2009/0180601 A1* | 7/2009 | Roberts et al. .......... 379/211.01 |
| 2009/0185669 A1 | 7/2009 | Zitnik et al. |
| 2009/0290696 A1 | 11/2009 | K. N. |
| 2009/0296694 A1* | 12/2009 | Kalyanpur .............. H04L 12/66 370/352 |
| 2010/0040049 A1* | 2/2010 | Benedyk et al. ............. 370/352 |
| 2010/0067671 A1 | 3/2010 | Cotignola et al. |
| 2010/0074138 A1 | 3/2010 | Hara et al. |
| 2010/0098232 A1 | 4/2010 | Wu et al. |
| 2010/0217600 A1 | 8/2010 | Lobzakov |
| 2010/0234021 A1 | 9/2010 | Ngai et al. |
| 2010/0303063 A1* | 12/2010 | Gibson ........................ 370/352 |
| 2010/0322392 A1 | 12/2010 | Walker et al. |
| 2011/0099478 A1 | 4/2011 | Gallagher et al. |
| 2011/0110274 A1* | 5/2011 | Coupland ............ H04M 3/2281 370/259 |
| 2011/0269424 A1 | 11/2011 | Multer et al. |
| 2011/0311037 A1 | 12/2011 | Zampiello |
| 2012/0178504 A1 | 7/2012 | Sweeney et al. |
| 2012/0214465 A1 | 8/2012 | Piccionelli et al. |
| 2014/0126428 A1* | 5/2014 | Khadri ............... H04M 3/42297 370/259 |

FOREIGN PATENT DOCUMENTS

| | | |
|---|---|---|
| WO | WO 2008/130709 A2 | 10/2008 |
| WO | WO-2009/003422 A1 | 1/2009 |
| WO | WO-2009/125418 A2 | 10/2009 |

OTHER PUBLICATIONS

Dialogic Corporation, Application Note: Color Ring Back Tone—Building Feature-Rich Wireless Applications with Dialogic Signaling Solutions, 2007, 14 pages.

Audiocodes Ltd., Application Description: Voice and Music Ring Back Tone Application for Wireless and Wireline Operators, 2004, 13 pages.

Wikipedia (Authors Unknown), Ringback Tone, http://en.wikipedia.org/wiki/Ringback_tone, downloaded Jun. 14, 2011, 3 pages.

Written Opinion of the International Searching Authority and International Search Report dated Oct. 5, 2010 in connection with PCT patent application PCT/CA2009/001908.

* cited by examiner

METHOD, SYSTEM NETWORK AND COMPUTER-READABLE MEDIA FOR CONTROLLING OUTGOING TELEPHONY CALLS TO CAUSE INITIATION OF CALL FEATURES

FIELD OF THE INVENTION

The invention relates generally to telecommunications and, more particularly, to method, system and computer-readable media for controlling outgoing telephony calls to cause initiation of call features.

BACKGROUND

The Public Switched Telephone Network (PSTN) that has been the backbone of telephony communications for a century is transforming rapidly. Since the 1970s, the PSTN has been controlled through a set of signaling protocols called Signaling System #7 (SS7) developed by the International Standardization Sector (ITU-T) of the International Telecommunication Union (ITU). SS7 is also known variously as Common Channel Signaling System 7 (CCSS7), C7, Number 7 and CCIS7. The SS7 network manages the setup and teardown of telephone calls being placed from Plain Old Telephone Service (POTS) telephones through telephone exchange switches such as Digital Multiplex System (DMS) switches manufactured by Nortel Networks Corporation of Brampton, Canada.

In the past two decades, Voice over Internet Protocol (VoIP) technologies have been developed that directly compete with the well established POTS telephony system. In VoIP networks, telephone terminals are coupled to Internet Protocol (IP)-based networks, such as the Internet or private IP networks, and telephone calls are managed with the use of call processing servers, often called soft switches. The well-established protocol for use with voice or video calls over IP-based networks is called Session Initiation Protocol (SIP).

VoIP calls controlled by SIP and POTS calls controlled by SS7 each currently have advantages and disadvantages. VoIP calls utilize the non-dedicated nature of IP-based networks to transmit voice packets in efficient manners via a mesh of routers while POTS calls are dedicated connections via digitally switched circuits. This distinction typically provides operational cost advantages to VoIP (and hence lower prices) while also in some circumstances diminishing the quality and security of the VoIP telephone connection as compared to the traditional POTS connection.

Another significant distinction between the two telephony technologies is the flexibility that is often built into the soft switches and SIP used to manage the VoIP call as compared to the traditional telephone exchange switches, such as the DMS, and SS7 protocols. While a number of call service features were launched on the DMS (ex. call forward, call waiting etc.), the introduction of VoIP and its flexibility has led to significant developments in call service features. For example, web-based control of call routing which triggers multiple telephone terminals to ring simultaneously or in sequence is common within VoIP.

Despite the advantages of VoIP, a large portion of telephone consumers are remaining with POTS telephones. This is due to many factors including call quality, limitations on 911 services within VoIP and unwillingness to switch from the security of having a communication system in their home/office that has proven over time to be highly reliable, even during power outages. One downside to this reliance on POTS technology is that these consumers often cannot be offered new call service features that are available within VoIP systems. Further, in many circumstances, the call processing and management of the call features within POTS networks may cost the service provider more compared to similar call processing and call feature management within VoIP networks.

Against this background, there is a need for solutions that will mitigate at least one of the above problems, particularly enabling additional flexibility in call processing and/or call feature management within POTS telephone networks.

SUMMARY OF THE INVENTION

According to a first broad aspect, the invention seeks to provide a method implemented by an IP-based call processing system for controlling an outgoing call initiated by a source device to a destination device. The source device is coupled to an SSP. The method includes causing the SSP to initiate a media connection between the IP-based call processing system and the source device in response to an indication of the outgoing call. The method further comprises causing initiation of a call feature for the outgoing call using at least the media connection between the IP-based call processing system and the source device; and causing establishment of a media connection between the source and destination devices.

According to a second broad aspect, the invention seeks to provide an IP-based call processing system for controlling an outgoing call initiated by a source device for connection to a destination device. The source device is coupled to an SSP. The system comprises a processing entity and a network interface. The processing entity is operative to cause the SSP to initiate a media connection between the call processing system and the source device in response to an indication of the outgoing call. The network interface is operative to establish a media connection with the source device in response to initiation by the SSP. The processing entity is further operative to cause initiation of a call feature for the outgoing call using at least the media connection with the source device; and to cause establishment of a media connection between the source and destination devices.

According to a third broad aspect, the invention seeks to provide a computer-readable media containing a program element executable by an IP-based call processing system to perform a method for controlling an outgoing call initiated by a source device to a destination device. The source device is coupled to an SSP. The computer-readable media comprises first, second and third program codes. The first program code is for causing the SSP to initiate a media connection between the IP-based call processing system and the source device in response to an indication of the outgoing call. The second program code is for causing initiation of a call feature for the outgoing call using at least the media connection between the IP-based call processing system and the source device. The third program code is for causing initiation of a call feature for the outgoing call using at least the media connection between the IP-based call processing system and the source device.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the invention is provided herein below, by way of example only, with reference to the accompanying drawings, in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

The present invention is directed to method, system and computer-readable media for controlling outgoing telephony calls to cause initiation of call features. As depicted in detail below, within embodiments of the present invention, telephone calls that are initiated through the Public Switched Telephone Network (PSTN) and controlled by SS7 signaling are selectively controlled by a call processing system within a packet-switched network, such as an IP network. Pushing the control of select telephone calls to the IP-based call processing system enables a number of advantages. For instance, in some circumstances, the IP-based call processing system can increase flexibility in call handling implementation by the service provider, enable added call features and/or improve the ability of consumers to directly interface with their call features/functionality.

Figure 1:
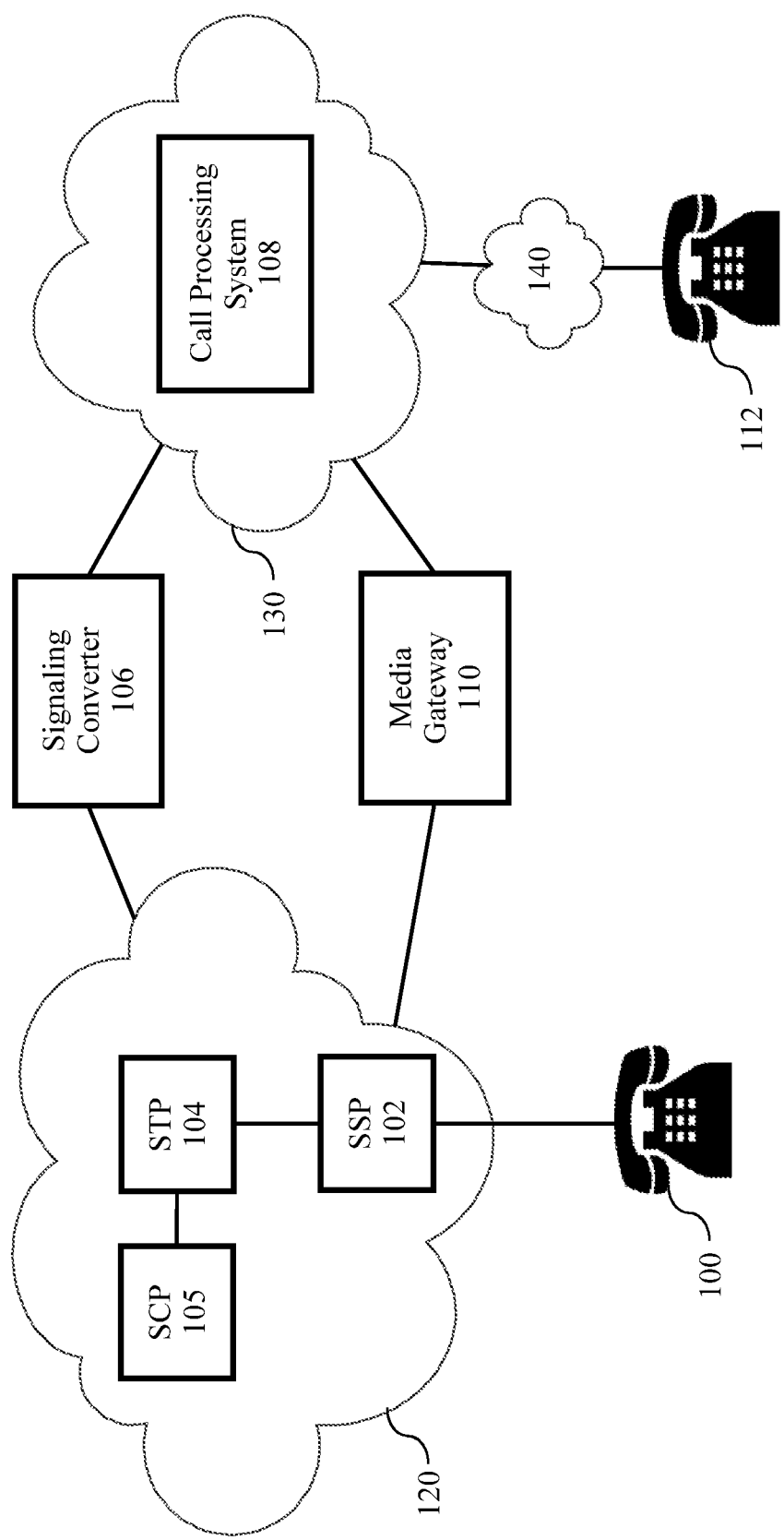
FIG. 1 is a network architecture block diagram according to an embodiment of the present invention.

FIG. 1 is a network architecture block diagram according to an embodiment of the present invention. FIG. 1 includes a Public Switched Telephone Network (PSTN) 120 which allows users of communication devices, such as a first communication device 100, to effect telephonic communications (ex. receive and originate calls). Various types of communication devices may be used by users to effect telephonic communications over the PSTN 120. For example, in various embodiments, a communication device used by a user (such as communication device 100) may be a wired Plain Old Telephony System (POTS) phone (including a cordless phone), a wireless phone (ex. a cellular phone or other mobile communication device, including a telephony-enabled Personal Digital Assistant (PDA)) or another communication device that can either directly or through another network interconnect with the PSTN 120.

As shown, the first communication device 100 is coupled to a Service Switching Point (SSP) 102. The SSP 102 is further coupled to one or more Signal Transfer Points (STPs), such as STP 104, and the STP 104 is further coupled to one or more Service Control Points (SCPs), such as SCP 105. One skilled in the art would understand the normal operation of the SSP 102, STP 104 and SCP 105 in establishing well-known telephonic communications between the communication device 100 and another communication device within the PSTN or within a VoIP network. The SSP 102 is a telephone switch equipped with SS7-capable software which terminates signaling links. The SSP 102 would generally originate, terminate or switch telephonic calls for wireline or wireless communication devices. In the case of wireless communication devices, the SSP 102 may comprise a wireless network switch or may comprise a plurality of entities that together allow a wireless communication device to originate, terminate or switch telephonic calls. The STP 104 is a packet switch of the SS7 network that receives and routes incoming signaling messages towards the proper destination and performs specialized routing functions. The SCP 105 is a database that provides information necessary for advanced call-processing capabilities. In one example, the SSP 102 can be implemented with a DMS-100 (Digital Multiplex System-100) telephone switch produced by Nortel Networks of Brampton, Canada; the STP 104 can be implemented with a Broadband STP produced by Nortel Networks of Brampton, Canada; and the SCP 105 can be implemented with an ISCP System produced by Telcordia Technologies Inc. of Piscataway, N.J.

Further shown in FIG. 1, a signaling converter 106 and a media gateway 110 are each coupled between the PSTN 120 and a data network 130. In this implementation, the data network 130 is based on the IP standard and therefore will be herein referred to as IP network 130, though data networks with alternative routing protocols could be used. The signaling protocol used within the IP network 130, according to some embodiments of the present invention, is Session Initiation Protocol (SIP), a well-known standard for Voice-over-Internet Protocol (VoIP) signaling. Therefore, the signaling converter 106 is an SS7/SIP converter in example embodiments described herein, as its primary purpose is to translate between SS7 signaling messages within the PSTN 120 and SIP messages within the IP network 130. One example product that can operate as the signaling converter 106 is an Internetwork Services Signaling Gateway (ISSG) produced by Nortel Networks Inc. of Brampton, Canada. The media gateway 110 is a PSTN/IP gateway in example embodiments described herein, as its primary purpose is to couple media connections (ex. voice circuits) within the PSTN 120 with media connections in the IP network 130. One example product that can operate as the media gateway 110 is a Packet Voice Gateway (PVG) produced by Nortel Networks Inc. of Brampton, Canada.

Also depicted within FIG. 1 is a call processing system 108 within the IP network 130 which can communicate with both the signaling converter 106 and the media gateway 110. Further, a second communication device 112 is shown that is coupled to the IP network 130 via a communications network 140. The communication device 112, as described in detail below, can be a destination for an outgoing call initiated by the first communication device 100. In this case, the communication device 112 may be a wired POTS phone (including a cordless phone), a wireless phone (ex. a cellular phone or other mobile communication device, including a telephony-enabled PDA), a VoIP phone, a POTS phone equipped with an analog terminal adaptor (ATA), a softphone (i.e. a computer equipped with telephony software), or a telephony-enabled television unit (ex. a set-top box connected to a television and a remote control). The communications network 140 may comprise a portion of one or more of the PSTN, a wireless network (ex. a cellular network), and a data network (ex. IP network 130).

The call processing system 108, according to some embodiments of the present invention, comprises an IP server that manages SIP message processing and further routes media packets (ex. VoIP packets) over the IP network 130. In some example implementations, the call processing system 108 comprises a soft switch such as a Broadworks Application Server produced by Broadsoft Inc. of Gaithersburg, Md.

Figure 2:
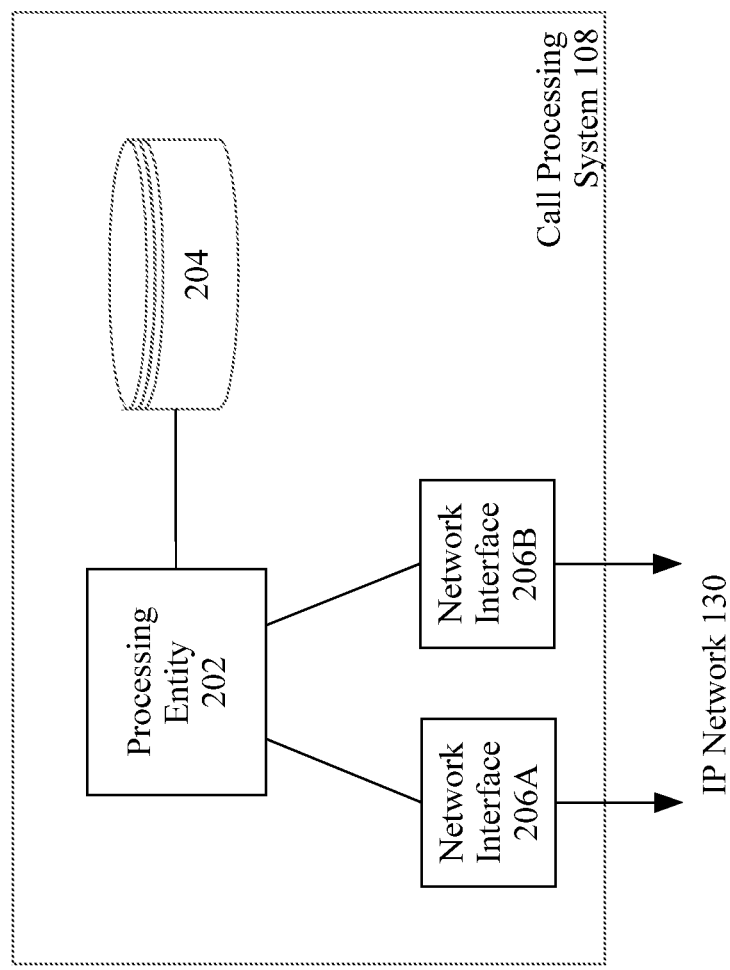
FIG. 2 is a logical block diagram of a call processing system according to an embodiment of the present invention.

FIG. 2 is a logical block diagram of the call processing system 108 according to an embodiment of the present invention. In this sample implementation, the call processing system 108 comprises a processing entity 202 coupled to a database 204. Further, the processing entity 202 is coupled to a plurality of network interfaces, shown in FIG. 2 as network interfaces 206A, 206B, that are each coupled to the IP network 130. The processing entity 202 can receive/transmit SIP messages and media packets from/to various entities within the IP network 130 via the plurality of network interfaces 206A, 206B. The processing entity 202, as will be described herein below in detail for a number of specific implementations, can analyze received SIP messages, conduct look-ups within the database 204 and determine appropriate SIP message responses. Further, the processing entity 202, as will also be described in detail below for a number of specific implementations, can perform numerous media packet processing tasks including but not limited to receiving, analyzing, generating, transmitting and routing media packets. It should be understood that, although depicted as a single element, the processing entity 202 could comprise a plurality of elements that together operate to provide the functionality as described herein below.

The database 204 can store application and customer specific information as will be described herein below. For instance, the database 204 may store call feature related information, customer specific settings for call features, subscription information, customer authentication information, standard call feature message information or other customer or service provider information that may be needed to process SIP messages and/or media packets according to embodiments of the present invention. It should be understood that, although depicted as a single element within the call processing system 108, the database 204 could comprise one or more remote storage elements coupled to the processing entity 202 via one or more of the network interfaces 206A, 206B; a plurality of storage elements within the call processing system 108; or a combination of remote and local storage elements.

Figure 3:
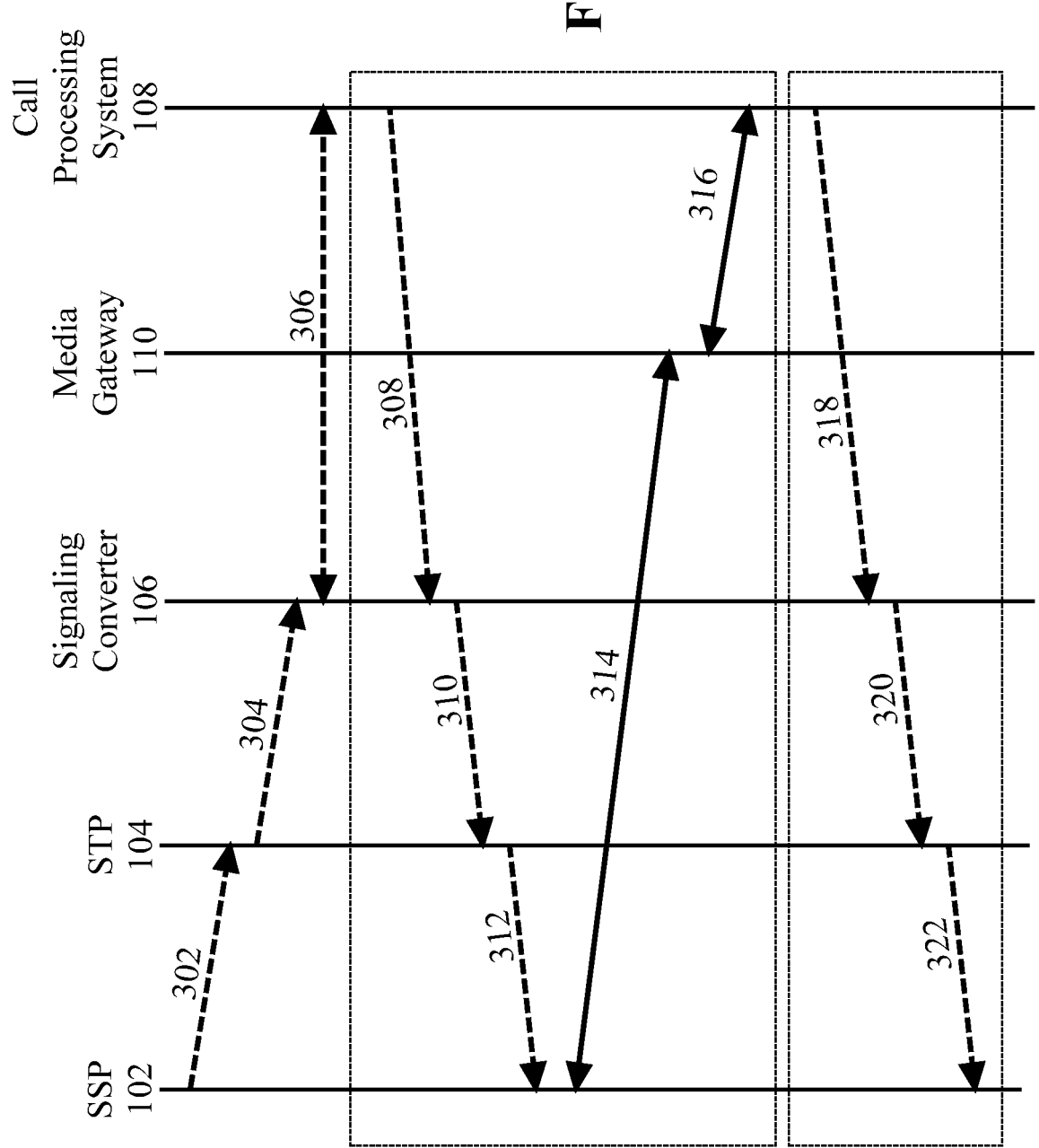
FIG. 3 is a signaling diagram for an outgoing call according to an embodiment of the present invention.
Figure 4:
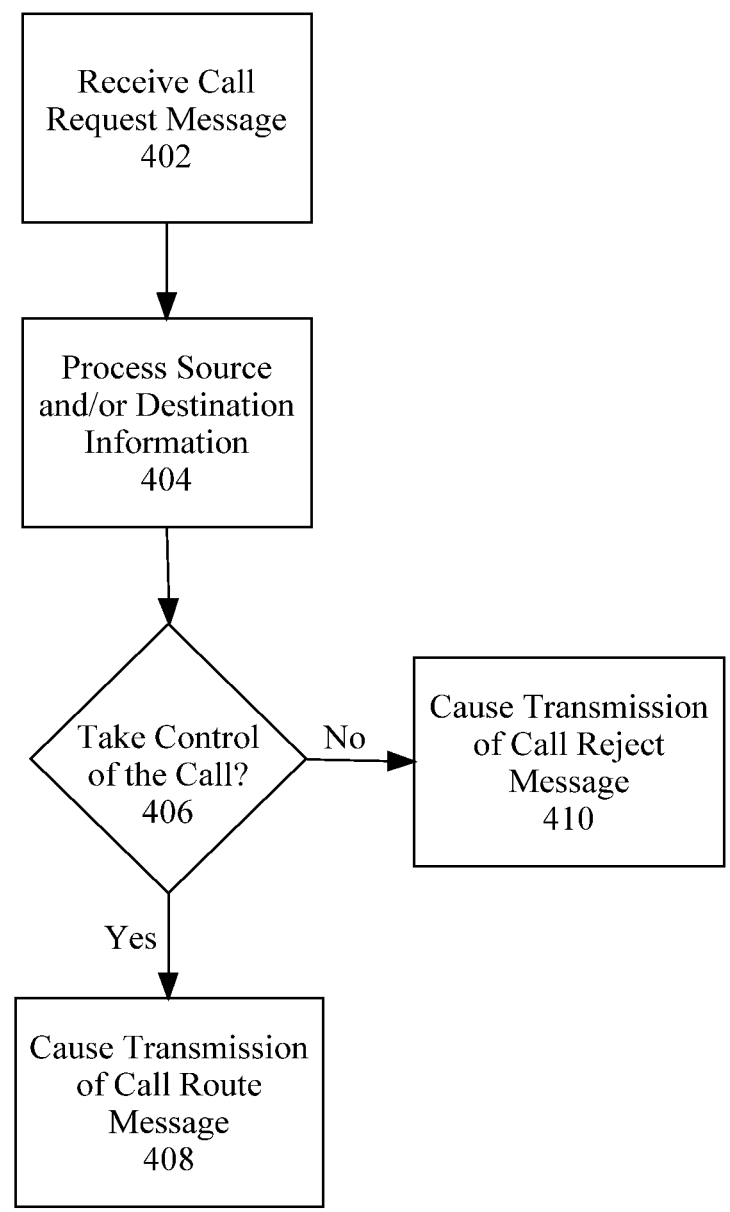
FIG. 4 is a flow chart depicting steps performed by a call processing system according to an embodiment of the present invention during a signaling stage of an outgoing call.

FIGS. 3 and 4 will be used as reference for a description of an outgoing call flow according to an embodiment of the present invention that utilizes the network architecture shown in FIG. 1. The signaling flow for an outgoing call is initiated upon a user activating the communication device 100 and attempting to make an outgoing call to a destination party by transmitting a destination identifier associated with the desired destination party to the SSP 102. For instance, in case of the communication device being a POTS telephone, the user can activate the communication device by taking the device "off hook" and can transmit the destination identifier by pressing Dual-Tone Multi-Frequency (DTMF) keys that together comprise a telephone number associated with the destination party on a keypad of the communication device 100. In other embodiments, the user may activate the communication device 100 and transmit the destination identifier in other manners. For instance, in some embodiments, the communication device has an address book from which the user may select a destination identifier based upon destination name or other associated identifier, this destination identifier being transmitted via DTMF tones or other means to the SSP 102. In other embodiments, the communication device 100 may have a "send" or "talk" selection option which when selected triggers the transmission of the destination identifier to the SSP 102, which in some implementations may comprise a wireless network switch, after the destination identifier has been selected by the user. This transmission of the destination identifier after the "send" or "talk" selection option has been made could also be seen as the activation of the communication device 100.

At this stage, the SSP 102 detects the activation of the communication device 100 and receives the destination identifier, thus receiving an outgoing call initiation from the communication device 100. In the case of the communication device 100 being a POTS telephone, the SSP 102 can have an Off Hook Delay (OHD) trigger associated with the communication device 100 which is detected when the communication device 100 goes "off hook" and a valid telephone number is interpreted from the received DTMF tones. Given that the OHD trigger is enabled, the SSP 102 can be assigned to transmit a TCAP message to the STP 104 for delivery to a specific destination such as the call processing system 108 via the signaling converter 106. The TCAP message, according to embodiments of the present invention, comprises the destination identifier (ex. a telephone number associated with the desired destination party) as well as a source identifier associated with the originator of the outgoing call (ex. a telephone number associated with the communication device 100). The communication device 100 that is used to originate the outgoing call can also be referred to as the source device while a communication device associated with the destination identifier can be referred to as the destination device.

The SSP 102 may have OHD triggers as described assigned to specific subscribers due to call features that the subscriber has enabled. Alternatively, a service provider that manages the SSP 102 may assign the OHD trigger as described to subscribers that it wishes to communicate with. Further, a service provider may assign the OHD trigger as described to all subscribers if specific features or functionality implemented with the call processing system 108 may be necessary for any subscriber. As will be described herein below in detail, the OHD trigger as described is assigned to subscribers that may require call processing from the call processing system 108.

FIG. 3 is a signaling diagram for an outgoing call according to an embodiment of the present invention. In this figure, the SSP 102 transmits the TCAP message described above (including the destination and source identifiers) as message 302 to the STP 104. The STP 104 forwards this TCAP message to the signaling converter 106 as message 304 as a result of routing instructions received from the SSP 102. The signaling converter 106 receives the TCAP message and translates it into a SIP message that comprises a call request message including the destination and source identifiers. The signaling converter 106 subsequently initiates a SIP communication session 306 with the call processing system 108 and transmits the call request message to the call processing system 108.

FIG. 4 is a flow chart depicting steps performed by the call processing system 108, according to an embodiment of the present invention, upon reception of the call request message from the signaling converter 106. As shown, the call processing system 108 receives the call request message at step 402. This call request message may be received at the processing entity 202 via one of the network interfaces 206A, 206B and may be a first message within a SIP session with the signaling converter 106. As described above, the call request message comprises the destination and source information for the initiated outgoing call.

At step 404, the processing entity 202 processes one or both of the source and destination identifiers. Specific examples of processing of the source and destination identifiers are described in detail herein with reference to FIGS. 6A, 6B, 6C, 8A, 8B, 10A and 10B. The processing of the source and/or destination identifiers may be performed with information stored within the database 204 or other sources of information internal or external to the call processing system 108. In some embodiments of the present invention, specific processing results can occur due to the destination identifier being a restricted number (ex. a toll number), specific call features that users of the source device have subscribed to, call feature settings for specific subscribers and/or the service provider's desire to contact a subscriber.

The processing of the source and/or destination identifiers at step 404 leads to a decision being made by the processing entity 202 at step 406. In particular, the processing entity 202 determines whether to take control of the outgoing call. The processing entity 202 can determine to take control of the outgoing call for many reasons including, but not limited to, enabling a call feature, conveying a message to the user of the source device, limiting outgoing calls from specified restricted numbers (ex. toll numbers) or based upon temporal restrictions (ex. time of day), connecting the source device to an alternative destination such as a customer service representative, initiating recording of the outgoing call, customizing audio to be played to the user of the source device while waiting for the destination device to answer the call, authenticating the user of the source device and/or other actions as may be desired by the user of the source device or the service provider. Specific examples of decisions for specific applications will be described in more detail herein below.

If the processing entity 202 determines to take control of the call at step 406, the processing entity 202, according to embodiments of the present invention, causes the transmission of a call route message at step 408. The call route message can take the form of a number of different SIP messages including, but not limited to, a 200 OK SIP message or another message that would indicate that the outgoing call should be routed to the call processing system 108. The call route message may indicate trunks that the outgoing call should be routed to in order to enable the outgoing call to be routed via the media gateway 110 to the call processing system 108. The call route message may be sent via one of the network interfaces 206A, 206B to the signaling converter 106 as shown as message 308 in FIG. 3. The signaling converter 106 then translates the call route message into a TCAP Call Route message and routes the TCAP Call Route message to the STP 104 as indicated by message 310. The TCAP Call Route message indicates that the outgoing call should be routed to the call processing system 108 via the media gateway 110. The STP 104 routes the TCAP Call Route message to the SSP 102 as shown as message 312. The SSP 102 will subsequently switch the media connection of the outgoing call from the communication device 100 through trunks within the PSTN 120 to the media gateway 110 as shown by media connection 314. The media gateway 110 then initiates a SIP session with call processing system 108 to establish media connection 316. At this point, there is a media connection between the communication device 100, via the SSP 102 and the media gateway 110, to the call processing system 108.

If the processing entity 202 determines not to take control of the call at step 406, the processing entity 202, according to embodiments of the present invention, causes the transmission of a call rejection message at step 410. The call rejection message can take the form of a number of different SIP messages including, but not limited to, a service unavailable message, an error message, an unauthorized call message, a service not implemented message or another message that would indicate rejection of the outgoing call by the processing entity 202. The call rejection message may be sent via one of the network interfaces 206A, 206B to the signaling converter 106 as shown as message 318 in FIG. 3. The signaling converter 106 then translates the call rejection message into a TCAP Continue message and routes the TCAP Continue message to the STP 104 as indicated by message 320. The TCAP Continue message indicates that the outgoing call should be processed as normal by the SSP 102 (i.e. without the use of the call processing system 108). The STP 104 routes the TCAP Continue message to the SSP 102 as shown as message 322. The SSP 102 will subsequently process the outgoing call using the destination identifier as normal using SS7 signaling, potentially requiring a look-up within the SCP 105 or the use of toll switches (not shown) as one skilled in the art would understand.

Figure 5A:
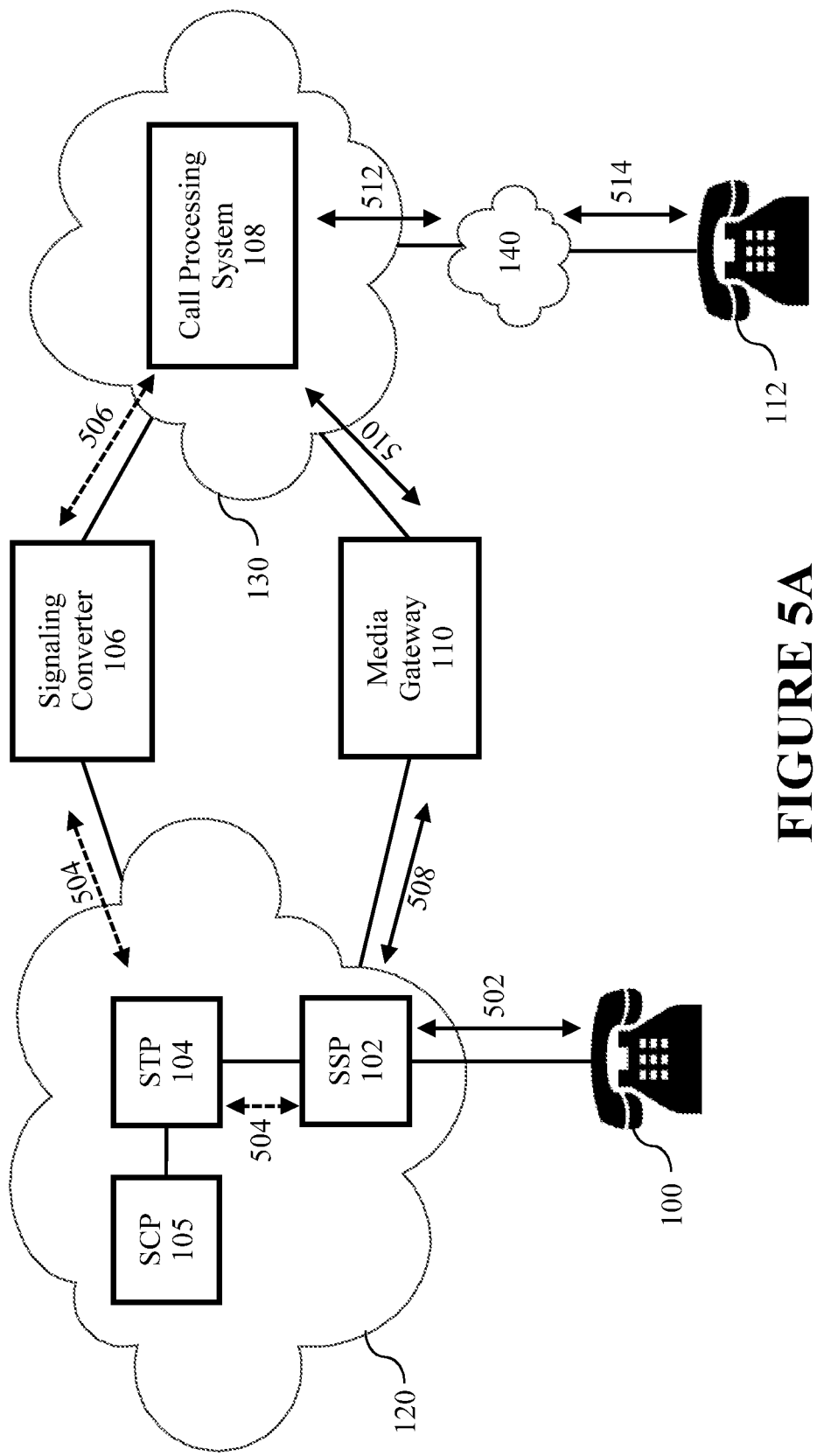
FIGS. 5A and 5B are network architecture block diagrams illustrating two example signaling and media connections potentially resulting from an embodiment of the present invention.
Figure 5B:
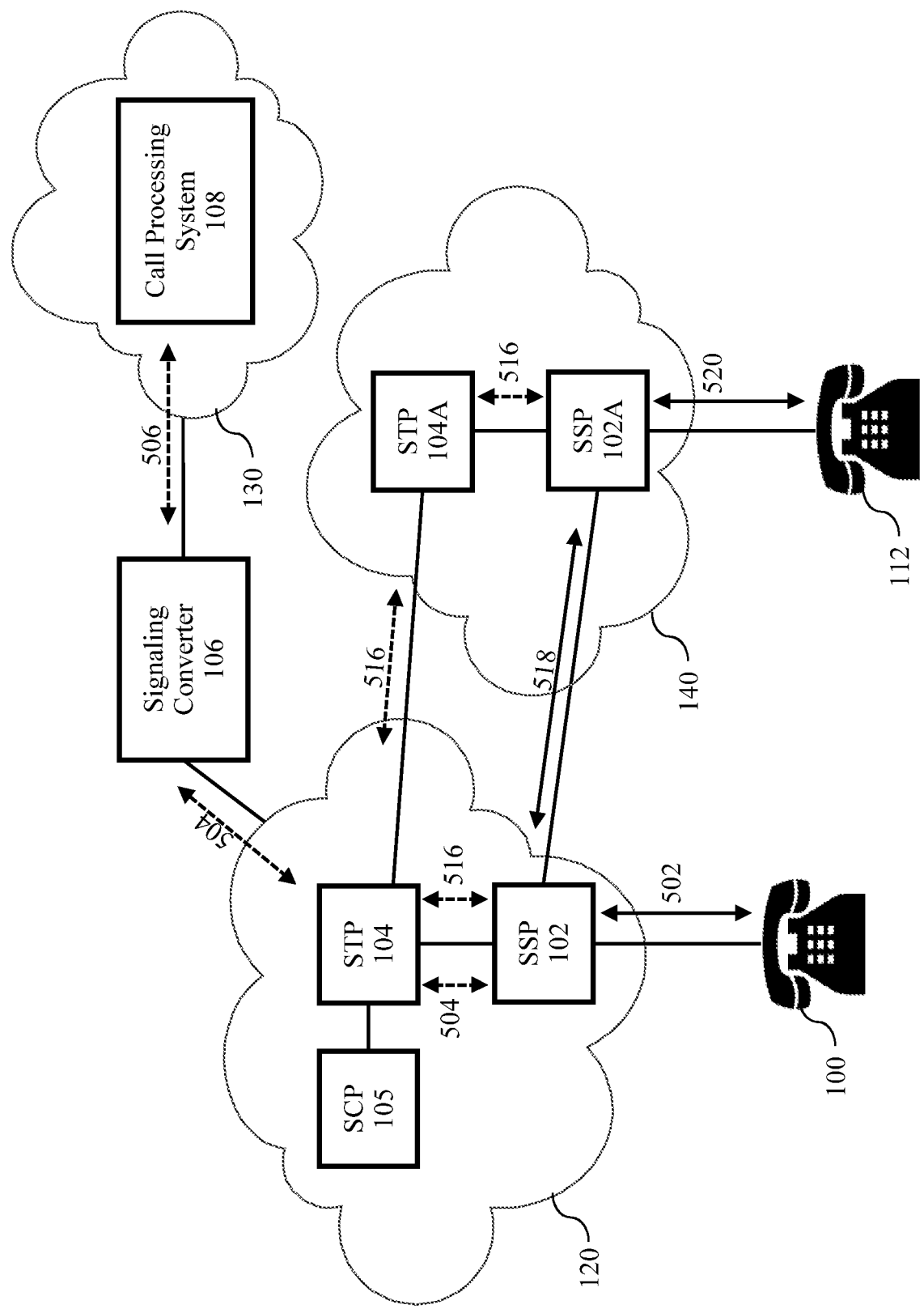

FIGS. 5A and 5B are network architecture block diagrams illustrating two example signaling and media connections potentially resulting from an embodiment of the present invention. FIG. 5A illustrates a similar network architecture to that described above for FIG. 1 and so like components have been identified with the same reference numbers. As shown, a media connection 502 is established between the communication device 100 and the SSP 102. This media connection may be established upon the user of the communication device 100 taking the device off hook and dialing a set of DTMF keys to indicate the desire to initiate an outgoing call to a destination device, in this case communication device 112. As described with reference to FIGS. 3 and 4, the SSP 102 initiates SS7 signaling 504 via the STP 104 to the signaling converter 106 in response to detecting the OHD trigger. The signaling converter 106 subsequently translates the SS7 signaling to SIP messages and communicates the messages with the call processing system 108 over a SIP session 506. In the example of FIG. 5A, the call processing system 108 responds with a call route message that indicates that it wants to control the outgoing call and for the media connection to be connected to the call processing system 108. This message is communicated back to the SSP 102 via the SIP session 506, the signaling converter 106 and the SS7 signaling 504 (as a TCAP Call Route message). In response, the SSP 102 establishes trunks 508 between itself and the media gateway 110 and the media gateway 110 establishes a media connection 510 with the call processing system 108.

The call processing system 108 at this stage then has a media connection with the communication device 100 and knows the source and destination identifiers for the outgoing call. The call processing system 108 may conduct numerous different actions at this point, examples of which will be described in detail for specific applications with reference to FIGS. 7A, 7B, 7C, 9A, 9B, 9C, 9D, 11A and 11B. In general, the call processing system 108 may enable a wide variety of functionality after the media connection to the communication device 100 is established including, but not limited to, conveying a media message to the user of the source device, routing the outgoing call using the destination identifier, routing the outgoing call to another destination (ex. a customer service representative), initiating a call feature (such as call record, 3-way call, call forward, call line ID block, etc.), authenticating the user of the source device, prompting the user of the source device to provide information, conveying a media element to the user of the source device while the user awaits the destination party to accept the call and/or other actions that a service provider may desire to enable. In the example depicted in FIG. 5A, the call processing system 108, possibly along with other functions, establishes a media connection 512 to the communications network 140 that controls the communication device 112. The communications network 140 may then establish a media connection 514 with the communication device 112, which together with media connections 502, 508, 510 and 512 can allow for the establishment of a complete media connection between the first communication device 100 (the source device) and the second communication device 112 (the destination device).

FIG. 5B illustrates a similar network architecture to that described for FIG. 5A and similar components and signaling are labeled with similar reference numbers. In this example, the call processing system 108 decides not to take control of the outgoing call and therefore responds with a call reject message that indicates that it does not want to control the outgoing call and for the outgoing call to be routed in a normal SS7 signaling manner. This message is communicated back to the SSP 102 via the SIP session 506, the signaling converter 106 and the SS7 signaling 504 (as a TCAP Continue message).

In the example of FIG. 5B, the communication device 112 is a POTS telephone and the communications network 140 is a portion of the PSTN. As shown, the communication device 112 is coupled to a second SSP 102A and the SSP 102A is coupled to a second STP 104A. Through PSTN/SS7 trunks, the SSP 102 is coupled to the second SSP 102A and the STP 104 is coupled to the second STP 104A. When the SSP 102 receives the TCAP Continue message, it proceeds to initiate SS7 signaling 516 via the STP 104 and the second STP 104A to the second SSP 102A. The SS7 signaling 516 enables the establishment of a media connection 518 between the SSP 102 and the second SSP 102A. At this stage, the SSP 102A may enable a media connection 520 between itself and the communication device 112, which together with media connections 502 and 518 can allow for the establishment of a complete media connection between the first communication device 100 (the source device) and the second communication device 112 (the destination device).

Example Implementations

Control logic implemented within the processing entity 202 of the call processing system 108 for various example implementations of the present invention are described with reference to FIGS. 6 through 11.

Toll Call Control Feature

Figure 6A:
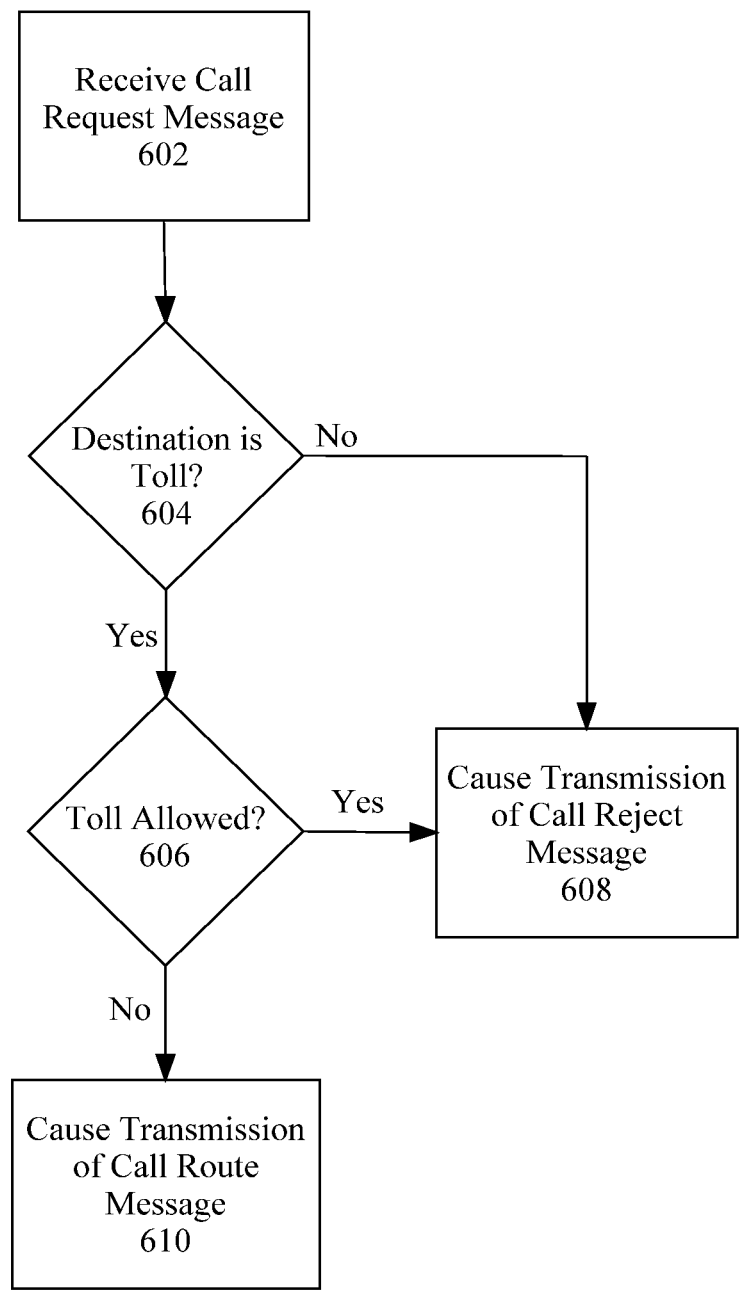
FIGS. 6A, 6B and 6C are flow charts depicting steps performed by a call processing system during signaling stages of outgoing calls that may be toll calls according to example implementations of the present invention.
Figure 6B:
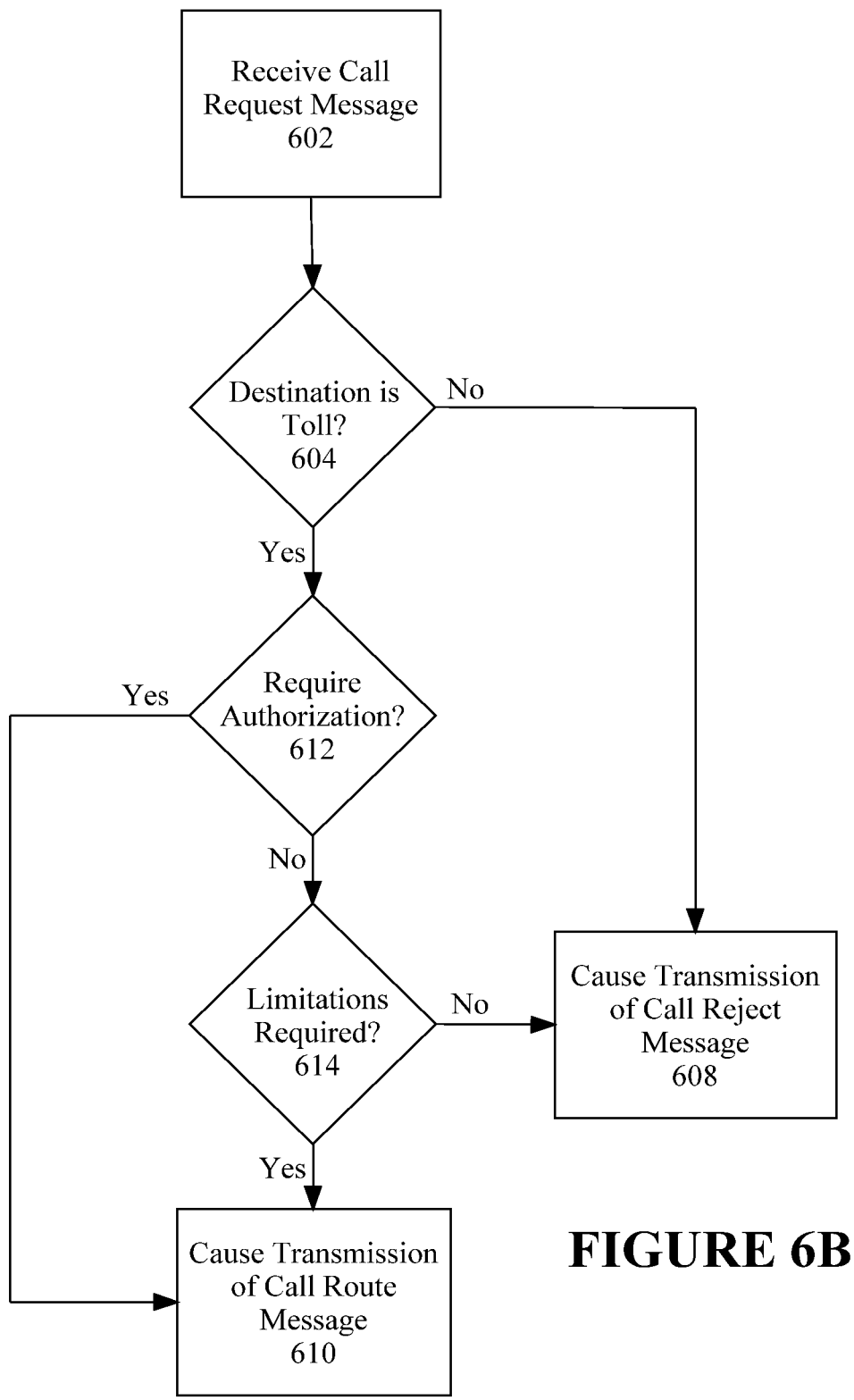
Figure 6C:
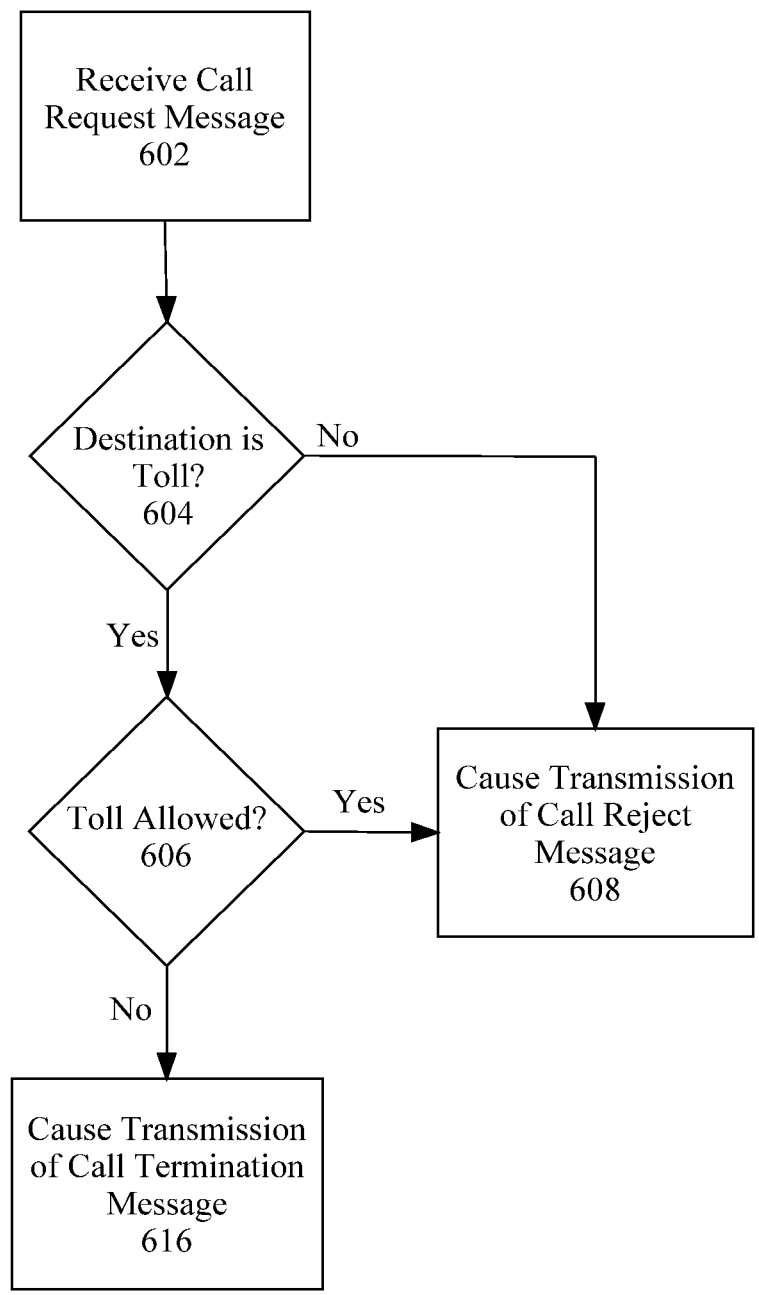

FIGS. 6A, 6B and 6C are flow charts depicting steps performed by the processing entity 202 within the call processing system 108 during signaling stages of outgoing calls that may be toll calls according to example implementations of the present invention. In various implementations, the call processing system 108 may take control of outgoing toll calls in order to convey a call restriction message to the user of the source device, to conduct an authentication step prior to allowing establishment of the outgoing call and/or to monitor the outgoing call in progress for call limitations.

As shown in FIG. 6A, the processing entity 202 receives a call request message at step 602 similar to previously described step 402 of FIG. 4. The call request message comprises source and destination identifiers for the outgoing call. At step 604, the processing entity 202 analyzes the destination identifier and determines whether the outgoing call would be a toll call for the particular source device. Toll calls could occur if the destination identifier of the outgoing call is long distance for the source device. Further, an indication of a toll telephone call could also be determined if the destination identifier of the outgoing call is a premium-rate telephony service (ex. 1-900 services in North America) or if the destination identifier of the outgoing call has an international calling code.

In the example of FIG. 6A, if the processing entity 202 determines that the outgoing call is not a toll call, the processing entity 202 decides not to take control of the outgoing call and causes the transmission of a call reject message at step 608, similar to the step 410 within FIG. 4. In this case, the outgoing call will be established using standard SS7 signaling techniques without control by the call processing system 108.

If the processing entity 202 determines that the outgoing call is a toll call, the processing entity 202 subsequently determines whether the toll call is allowed at step 606. Various different rules could apply to make the determination on whether the toll call is allowed. For instance, particular subscribers could enable specific call restrictions including, but not limited to, blocking all or a select set of toll calls, blocking all or a select set of long distance calls, blocking all or a select set of premium-rate calls, blocking all or a select set of international calls. In some embodiments, the processing entity 202 can access the database 204 or another storage entity internal or external to the call processing system 108 in order to determine specific restrictions set by a subscriber. The source identifier (ex. source telephone number) can be used to look-up the particular subscriber's restriction settings.

If the processing entity 202 determines that the toll call is allowed at step 606, the processing entity 202 decides not to take control of the outgoing call and causes the transmission of a call reject message at step 608, similar to the step 410 within FIG. 4. In this case, the outgoing call will be established using standard SS7 signaling techniques without control by the call processing system 108.

If the processing entity 202 determines that the toll call is not allowed at step 606, the processing entity 202 decides to take control of the outgoing call and causes the transmission of a call route message at step 610, similar to the step 408 within FIG. 4. In this case, as is described in detail above, a media connection will be established between the source device and the call processing system 108. This media connection can allow the call processing system 108 to perform a number of functions, such as conveying a media message described in detail with reference to FIG. 7A.

Although the flow chart of FIG. 6A is described with the step of determining if the outgoing call is a toll call based on the destination identifier prior to the determining if toll calls are allowed, it should be understood that the order of these steps could be reversed. In particular, if all toll calls are allowed that are initiated by the source device, there is no need to determine if the call is a toll call and the processing entity 202 can cause the transmission of the call reject message at step 608. Further, although the flow chart of FIG. 6A is limited to toll calls, it should be understood that similar logic could apply more generally to any set of restricted destination identifiers, irrespective of whether the outgoing call would result in a toll call. For instance, a particular subscriber could preset a set of restricted destination identifiers that are not allowed. Alternatively, a particular subscriber could preset a set of acceptable destination identifiers that are allowed, with all other destination identifiers not allowed. Within these example implementations, the processing entity 202 can cause the transmission of a call reject message similar to step 608 if the outgoing call is allowed and can cause the transmission of a call route message similar to step 610 if the outgoing call is not allowed.

Figure 7A:
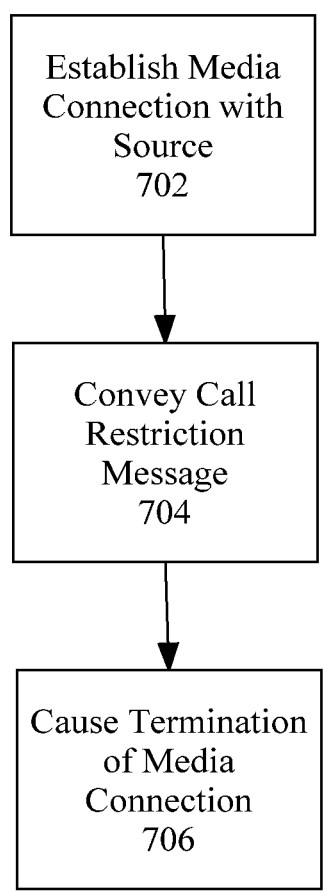
FIG. 7A is a flow chart depicting steps performed by a call processing system after a media connection has been established between a source device of an outgoing call and the call processing system as a result of logic within FIG. 6A.

FIG. 7A is a flow chart depicting steps performed by the processing entity 202 within the call processing system 108 after a media connection has been established between the source device and the call processing system 108 as a result of the transmission of the call route message at step 610 of FIG. 6A. As shown, the processing entity 202 first establishes a media connection with the source device at step 702. Next, at step 704, the processing entity 202 conveys a call restriction message to the source device. This message could take many forms. For example, the call restriction message could comprise an audio statement such as "This telephone service is not authorized for international calls. Please call 310-BELL or login to your account at www.bell.ca if you would like to modify this setting. We apologize for the inconvenience". As should be understood, this call restriction message could take many alternative forms and could be general or specific in nature. For instance, information within the call restriction message could specify what type of restriction has been applied (ex. long distance restriction, premium-rate telephony service restriction, international call restriction, select set of restricted destinations, select set of allowed destinations) or could remain general. The call restriction message could further include notice to how to change the setting and/or the entity that has set the restriction (ex. Corporate Policy, Dad).

In some alternative embodiments, the call restriction message could further comprise a prompt to connect with a customer service representative to change the setting. In this case (not shown in FIG. 7A), if the user of the source device selects this option, the processing entity 202 can look-up a destination identifier associated with a customer service representative and cause a media connection between the source device and the customer service representative to be established.

As depicted in FIG. 7A at step 706, after conveying the call restriction message to the source device, the processing entity 202, in this example, causes the termination of the media connection. The processing entity 202 does not cause the outgoing call to be completed and a media connection is not established between the source device and the desired destination device.

FIG. 6B is a flow chart similar to the flow chart of FIG. 6A but with two additional determination steps. Within FIG. 6B, after determining the outgoing call is a toll call at step 604, rather than simply determining if the outgoing toll call is allowed, the processing entity 202 determines whether the outgoing toll call requires authorization at step 612 and/or whether there are call limitations on outgoing toll calls at step 614. Call limitations on outgoing toll calls could include a number of restrictions; for example, the length of time of the call or the time of day of the call. Various different rules could apply to make the determination on whether the toll call requires authorization and/or requires call limitations. For instance, particular subscribers could enable specific call restrictions including, but not limited to, requiring authorization on all or a select set of toll calls, requiring authorization on all or a select set of calls to a set of restricted numbers, requiring authorization on all or a select set of calls that are not to a set of acceptable numbers, requiring call limitations on all or a select set of toll calls. In some embodiments, the processing entity 202 can access the database 204 or another storage entity internal or external to the call processing system 108 in order to determine specific restrictions set by a subscriber. The source identifier (ex. source telephone number) can be used to look-up the particular subscriber's restriction settings.

In the particular logic depicted in FIG. 6B, if neither authorization for outgoing toll calls is required at step 612 nor call limitations on outgoing toll calls at step 614, the processing entity 202 decides not to take control of the outgoing call and causes the transmission of a call reject message at step 608, similar to the step 410 within FIG. 4. In this case, the outgoing call will be established using standard SS7 signaling techniques without control by the call processing system 108.

If either authorization for outgoing toll calls is required at step 612 or there are limitations on outgoing toll calls at step 614, the processing entity 202 decides to take control of the outgoing call and causes the transmission of a call route message at step 610, similar to the step 408 within FIG. 4. In this case, as is described in detail above, a media connection will be established between the source device and the call processing system 108. This media connection can allow the call processing system 108 to perform a number of functions, such as conveying a media message, performing call authorization and/or enabling call limitation monitoring described in detail with reference to FIGS. 7B and 7C.

Figure 7B:
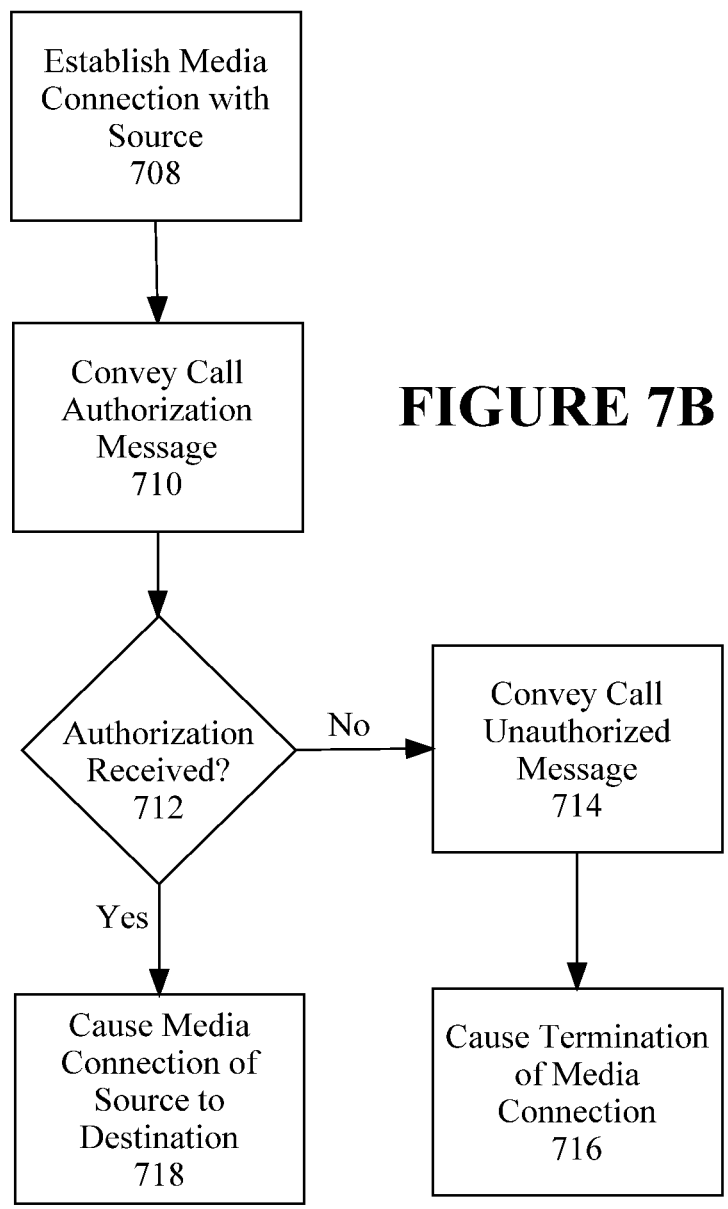
FIGS. 7B and 7C are flow charts depicting steps performed by a call processing system after a media connection has been established between a source device of the outgoing call and the call processing system as a result of logic within FIG. 6B.
Figure 7C:
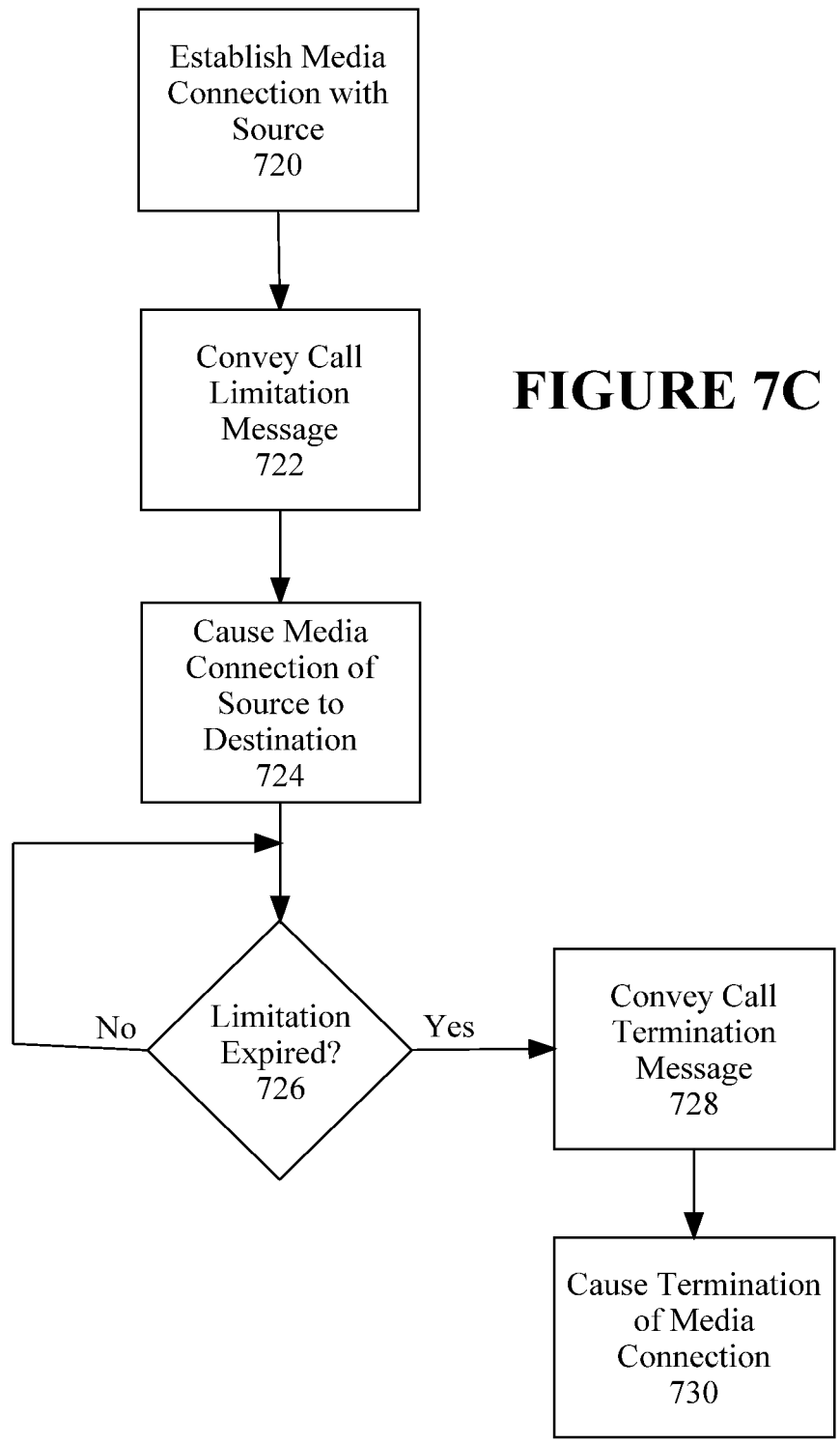

FIGS. 7B and 7C are flow charts depicting steps performed by the processing entity 202 within the call processing system 108 after a media connection has been established between the source device and the call processing system as a result of the transmission of the call route message at step 610 of FIG. 6B. FIG. 7B depicts steps performed by the processing entity 202 in an example implementation in which authorization of an outgoing toll call is required while FIG. 7C depicts steps performed by the processing entity 202 in an example implementation in which a call limitation on an outgoing toll call is required to be monitored. It should be understood that, although the sets of steps for these two functionalities are shown separately, they are not mutually exclusive and the processing entity 202 can perform the steps of both functionalities or an integrated version of the steps for a single outgoing toll call.

As shown in FIG. 7B, the processing entity 202 first establishes a media connection with the source device at step 708. Next, at step 710, the processing entity 202 conveys a call authorization message to the source device. This message could take many forms. For example, the call authorization message could comprise an audio statement such as "International calls on this telephone service require authorization to proceed. Please enter your PIN for validation". As should be understood, this call authorization message is just one specific example and the message could be general or specific in terms of the restrictions that have been applied and could be directed at a number of different manners in which the user of the source device could authorize the outgoing toll call. For instance, information within the call authorization message could specify what type of restriction has been applied (ex. long distance restriction, premium-rate telephony service restriction, international call restriction, select set of restricted destinations, select set of allowed destinations) or could remain general. Further, the processing entity 202 could enable authorization in a number of manners including, but not limited to, authenticating a Personal Identification Number (PIN) entered by DTMF tones or interpreted with voice recognition; authenticating a password/phrase interpreted by voice recognition; authenticating a voice print of a user of the source device; authenticating biometric data of a user of the source device extracted from an offline device such as a finger print scanner or retinal scanner; or authenticating other personal data/information/biometric information that could authenticate a user of the source device. The call authorization message typically would include a prompting to the user of the source device to provide the valid authorization data.

In some alternative embodiments, the call authorization message could further comprise a prompt to connect with a customer service representative to change the setting or to temporarily authorize toll calls (ex. on a case-by case basis or for a limited amount of time or for a limited number of outgoing toll calls). In this case (not shown in FIG. 7B), if the user of the source device selects this option, the processing entity 202 can look-up a destination identifier associated with a customer service representative and cause a media connection between the source device and the customer service representative to be established.

As depicted in FIG. 7B at step 712, after conveying the call authorization message to the source device, the processing entity 202 determines whether authorization has been received. This determination can be achieved in numerous manners and is linked to the authorization technique that the processing entity 202 has prompted the user of the source device to utilize. For each authorization technique (ex. PIN, passcode, voice print, biometric data), the processing entity 202 can determine if it has received candidate data from the user of the source device within a predetermined period of time and subsequently whether the candidate data is valid. Valid authorization data that can be used to compare to the candidate data can be retrieved from the database 204 or another storage entity internal or external to the call processing system 108.

If the processing entity 202 does not receive proper authorization at step 712, in the example of FIG. 7B, the processing entity 202 conveys a call unauthorized message to the source device at step 714. This message could take many forms. For example, the call unauthorized message could comprise an audio statement such as "The PIN provided was not able to be authenticated and therefore the call cannot be connected. Please call 310-BELL or login to your account at www.bell.ca if you would like to modify your settings. We apologize for the inconvenience". As should be understood, this call unauthorized message could take many alternative forms and could be general or specific in nature. For instance, information within the call unauthorized message could specify why the authorization was not successful and a means to correct the situation.

In some alternative embodiments, the call unauthorized message in step 714 could further comprise a prompt to enter credit card information (or other financial payment information) to pay for the outgoing toll call. In this case (not shown in FIG. 7B), if the user of the source device selects this option, the processing entity 202 can interface with a payment processing entity (not shown) that can establish either a set pre-payment monetary amount for use by user of the source device during the outgoing toll call (and possibly future outgoing toll calls) or can establish a post-payment relationship for the user of the source device. In some embodiments, the call authorization message in step 710 could comprise a prompt to enter credit card information (or other financial payment information) to pay for the outgoing toll call. In this case, the processing entity 202 can determine that authorization is received if credit card or other financial payment arrangements are made with the user of the source device.

In other alternative embodiments, the call unauthorized message could further comprise a prompt to connect with a customer service representative to setup, modify or disable the toll call authorization settings. In this case (not shown in FIG. 7B), if the user of the source device selects this option, the processing entity 202 can look-up a destination identifier associated with a customer service representative and cause a media connection between the source device and the customer service representative to be established.

As depicted in FIG. 7B at step 716, after conveying the call unauthorized message to the source device at step 714, the processing entity 202, in this example, causes the termination of the media connection. The processing entity 202 does not cause the outgoing call to be completed and a media connection is not established between the source device and the desired destination device.

If the processing entity 202 does receive proper authorization at step 712, in the example of FIG. 7B, the processing entity 202 causes a media connection at step 718 to be established between the source device and the desired destination device. This media connection can be established in a number of manners. In one example, the processing entity 202 causes the establishment of a media connection between the call processing system 108 and the destination device and subsequently bridges it with the already established media connection between the source device and the call processing system 108. Other techniques for the call processing system 108 to connect the source and destination devices should be understood.

As previously indicated, FIG. 7C depicts steps performed by the processing entity 202 after a media connection has been established between the source device and the call processing system as a result of the transmission of the call route message at step 610 of FIG. 6B. In FIG. 7C, the steps illustrate an example implementation in which a call limitation on an outgoing toll call is required to be monitored. As shown at step 720, the processing entity 202 first establishes a media connection with the source device. Next, at step 722, the processing entity 202 conveys a call limitation message to the source device. This message could take many forms. For example, the call limitation message could comprise an audio statement such as "You have 30 minutes for this call". To generate this message, the processing entity 202 may extract limitation information from the database 204 or another storage entity internal or external to the call processing system 108. The source identifier (ex. source telephone number) can be used to look-up the particular subscriber's restriction settings. The limitation information could include, but is not limited to, indications on limited monetary credit that is available for toll calls, indications on limited length of time available for any one or a combination of toll calls, indications on temporal limitations for toll calls to be enabled (ex. toll calls may only be authorized at specified low cost time periods (ex. 8 pm to 8 am)), or subscriber or service provider defined settings for toll calls. The call limitation message could provide information concerning the limitation for the specific toll call.

After conveying the call limitation message, in the example of FIG. 7C, the processing entity 202 causes a media connection to be established at step 724 between the source device and the desired destination device. This media connection can be established in a number of manners. In one example, the processing entity 202 triggers the establishment of a media connection between the call processing system 108 and the destination device and subsequently bridges it with the already established media connection between the source device and the call processing system 108. Other techniques for the call processing system 108 to connect the source and destination devices should be understood.

After establishing the media connection between the source and destination devices, the processing entity 202 monitors whether the set limitation has expired at step 726. The limitation as described above can be one or more of numerous potential restrictions including, but not limited to, a set length of time, a monetary amount, a temporal restriction or related to a subscriber or service provider defined setting. In some example operational cases, the limitation may not expire before the toll call is terminated by normal means (i.e. one of the parties hanging up) and thus the steps of FIG. 7C never proceed past step 726 before the call is terminated by other means.

If the processing entity 202 detects that the limitation has expired at step 726, in the example of FIG. 7C, the processing entity 202 conveys a call termination message to the source device at step 728 (and possibly to other party(s) in the call). This message could take many forms. For example, the call termination message could comprise an audio statement such as "Your credit has expired. This call will terminate in 30 seconds. We apologize for the inconvenience". As should be understood, this call termination message could take many alternative forms and could be general or specific in nature. For instance, information within the call termination message could specify how to reset the limitation (i.e. add credit to your account, change settings) and a time before which the call will terminate.

In some alternative embodiments, the call termination message in step 728 could further comprise a prompt to enter credit card information (or other financial payment information) to add credit to continue the toll call. In this case (not shown in FIG. 7C), if the user of the source device selects this option, the processing entity 202 can interface with a payment processing entity (not shown) that can establish either a set pre-payment monetary amount for use by the user of the source device during the toll call (and possibly future toll calls) or can establish a post-payment relationship for the user of the source device.

In other alternative embodiments, the call termination message could further comprise a prompt to connect with a customer service representative to setup, modify or disable the toll call limitation settings. In this case (not shown in FIG. 7C), if the user of the source device selects this option, the processing entity 202 can look-up a destination identifier associated with a customer service representative and cause a media connection between the source device and the customer service representative to be established.

As depicted in FIG. 7C at step 728, after conveying the call termination message, the processing entity 202, in this example, causes the termination of the media connection between the source and destination devices, thus terminating the toll call.

Although the example implementations described above depict cases in which the call processing system 108 both controls the signaling of outgoing calls that may be toll calls (as described with reference to FIGS. 6A and 6B) and also controls the establishment of media connections (as described with reference to FIGS. 7A, 7B and 7C), in alternative implementations for toll call management, the call processing system 108 only controls the signaling of outgoing calls that may be toll calls. Specifically, FIG. 6C depicts an alternative example to the flow chart of FIG. 6A. In FIG. 6C, if the outgoing toll call is not allowed at step 606, rather than cause the transmission of a call route message at step 610, the processing entity 202 causes the transmission of a call termination message at step 616. Rather than trigger the routing of the outgoing call to the call processing system 108, the call termination message would indicate that the outgoing call should be terminated. The call termination message can take the form of a number of different SIP messages including, but not limited to, a SIP BYE message or an "error response [403 forbidden]" message or another message that would indicate that the outgoing call should be terminated. The call termination message may be translated by the signaling converter 106 into a TCAP End message and routed to the SSP. The SSP will proceed with normal rejection treatment for the call, which will differ depending upon the setting on the SSP. For instance, in some implementations, the SSP would simply provide a busy tone while in other implementations a media message may be conveyed such as "The number dialed is not authorized". In this example, the call processing system 108 controls the signaling of the outgoing call but does not establish a media connection with the source device.

The call processing flow chart of FIG. 6C may apply to other implementations and is not limited to cases of restrictions on toll calls. For example, the processing entity 202 could implement a flow chart similar to FIG. 6C but verifying a different aspect of the outgoing call in steps 604 and 606. In one implementation, a service account associated with the source identifier could be validated to ensure that the service account is in good standing and not suspended or terminated. In this case, if the service account is in good standing and communication devices associated with the service account are allowed to make outgoing calls, the processing entity 202 would allow the outgoing call and proceed with step 608 as described above. If the service account is not in good standing, is suspended, is terminated or is otherwise in a state that does not allow for outgoing calls, the processing entity 202 would not allow the outgoing call and proceed with step 616 as described above.

Call Feature Control

Figure 8B:
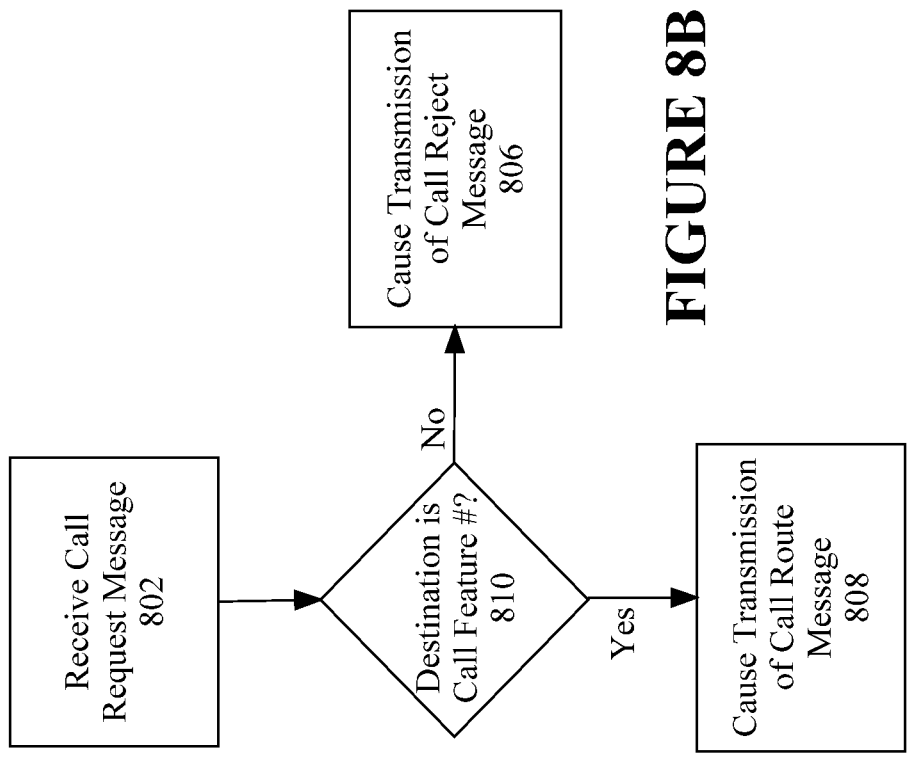
FIGS. 8A and 8B are flow charts depicting steps performed by a call processing system during signaling stages of outgoing calls that may require initiation of a call feature according to example implementations of the present invention.
Figure 8A:
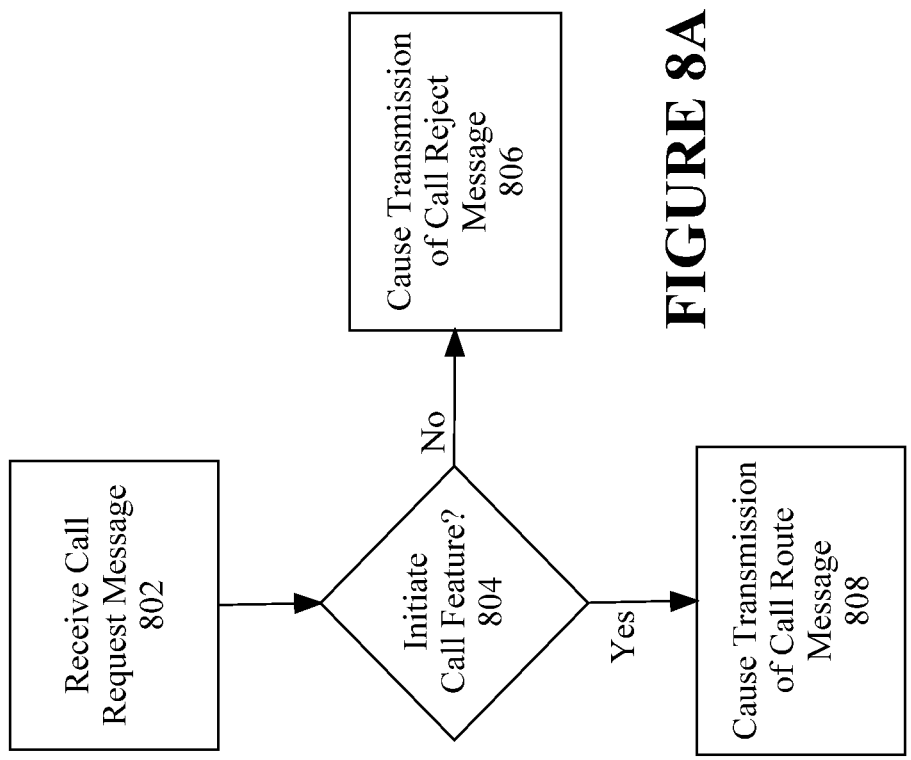

FIGS. 8A and 8B are flow charts depicting steps performed by the processing entity 202 within the call processing system 108 during signaling stages of outgoing calls that may require initiation of a call feature according to example implementations of the present invention. As shown in FIG. 8A, the processing entity 202 receives a call request message at step 802 similar to previously described step 402 of FIG. 4. The call request message comprises source and destination identifiers for the outgoing call. At step 804, the processing entity 202 analyzes the source identifier (and possibly also the destination identifier) to determine whether a call feature should be initiated. This determination can be performed in a number of different manners. In one implementation, the processing entity 202 can perform a look-up within the database 204 or another storage entity internal or external to the call processing system 108 to determine whether the user of the source device is subscribed to a call feature that would require the call processing system 108 to control the outgoing call. In some implementations, the user can set call feature settings with a customer service representative or through online tools. In other implementations, the service provider could subscribe a customer to a call feature or potentially could enable a call feature for all or a defined set of customers.

In the example of FIG. 8A, if the processing entity 202 determines that a call feature that requires the call processing system 108 to take control of the outgoing call does not need to be initiated, the processing entity 202 decides not to take control of the outgoing call and causes the transmission of a call reject message at step 806, similar to the step 410 within FIG. 4. In this case, the outgoing call will be established using standard SS7 signaling techniques without control by the call processing system 108.

If the processing entity 202 determines that a call feature that requires the call processing system 108 to take control of the outgoing call does need to be initiated, the processing entity 202 decides to take control of the outgoing call and causes the transmission of a call route message at step 808, similar to the step 408 within FIG. 4. In this case, as is described in detail above, a media connection will be established between the source device and the call processing system 108. This media connection can allow the call processing system 108 to perform a number of call features, a limited set of which will be described in detail with reference to FIGS. 9A, 9B and 9C.

The flow chart of FIG. 8B is similar to that of FIG. 8A in that it depicts steps performed by the processing entity 202 within the call processing system 108 during signaling stages of outgoing calls that may require initiation of a call feature. Within FIG. 8B, rather than determine whether a call feature should be initiated at step 804 based upon the source identifier, the processing entity 202 determines whether the destination identifier comprises an identifier assigned to a call feature, hereinafter referred to as a call feature identifier. For instance, the processing entity 202 may have a set of identifiers (ex. telephone numbers) that are assigned to particular call features which will be activated if a communication device dials the particular call feature identifier as its destination identifier. If one of the call feature identifiers is dialed as the destination identifier, the processing entity 202 can determine that a call feature should be initiated. As will be described below in detail, the processing entity 202 may subsequently need to acquire a second destination identifier associated with a desired destination device from the source device to initiate the outgoing call between the source device and the desired destination device.

Similar to the flow chart of FIG. 8A, if the processing entity 202 determines that a call feature that requires the call processing system 108 to take control of the outgoing call does not need to be initiated, the processing entity 202 decides not to take control of the outgoing call and causes the transmission of a call reject message at step 806, similar to the step 410 within FIG. 4. In this case, the outgoing call will be established using standard SS7 signaling techniques without control by the call processing system 108.

If the processing entity 202 determines that a call feature that requires the call processing system 108 to take control of the outgoing call needs to be initiated, the processing entity 202 decides to take control of the outgoing call and causes the transmission of a call route message at step 808, similar to the step 408 within FIG. 4. In this case, as is described in detail above, a media connection will be established between the source device and the call processing system 108. This media connection can allow the call processing system 108 to perform a number of call features, one of which will be described in detail with reference to FIG. 9D.

Figure 9A:
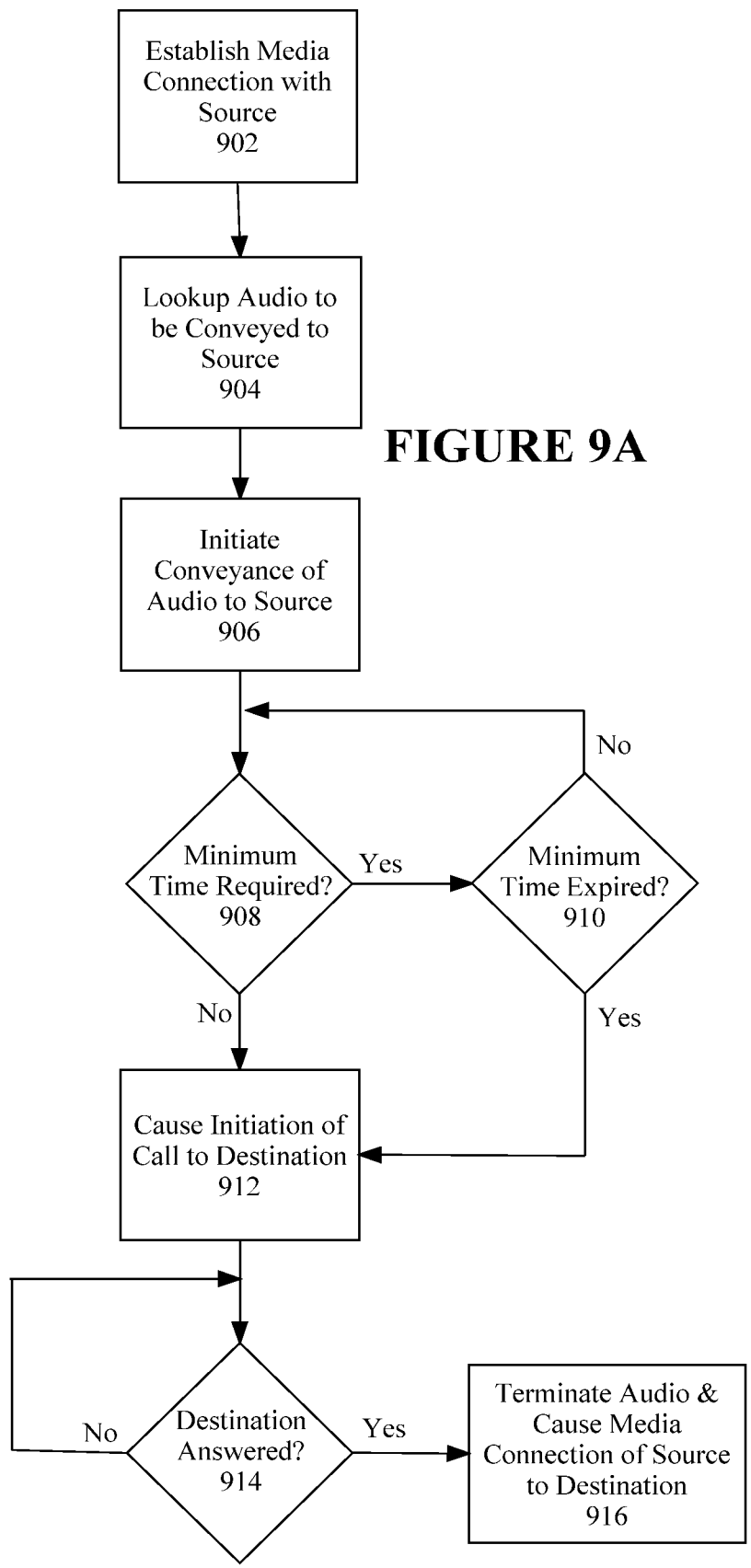
FIGS. 9A, 9B and 9C are flow charts depicting steps performed by a call processing system after a media connection has been established between a source device of the outgoing call and the call processing system as a result of logic within FIG. 8A.
Figure 9B:
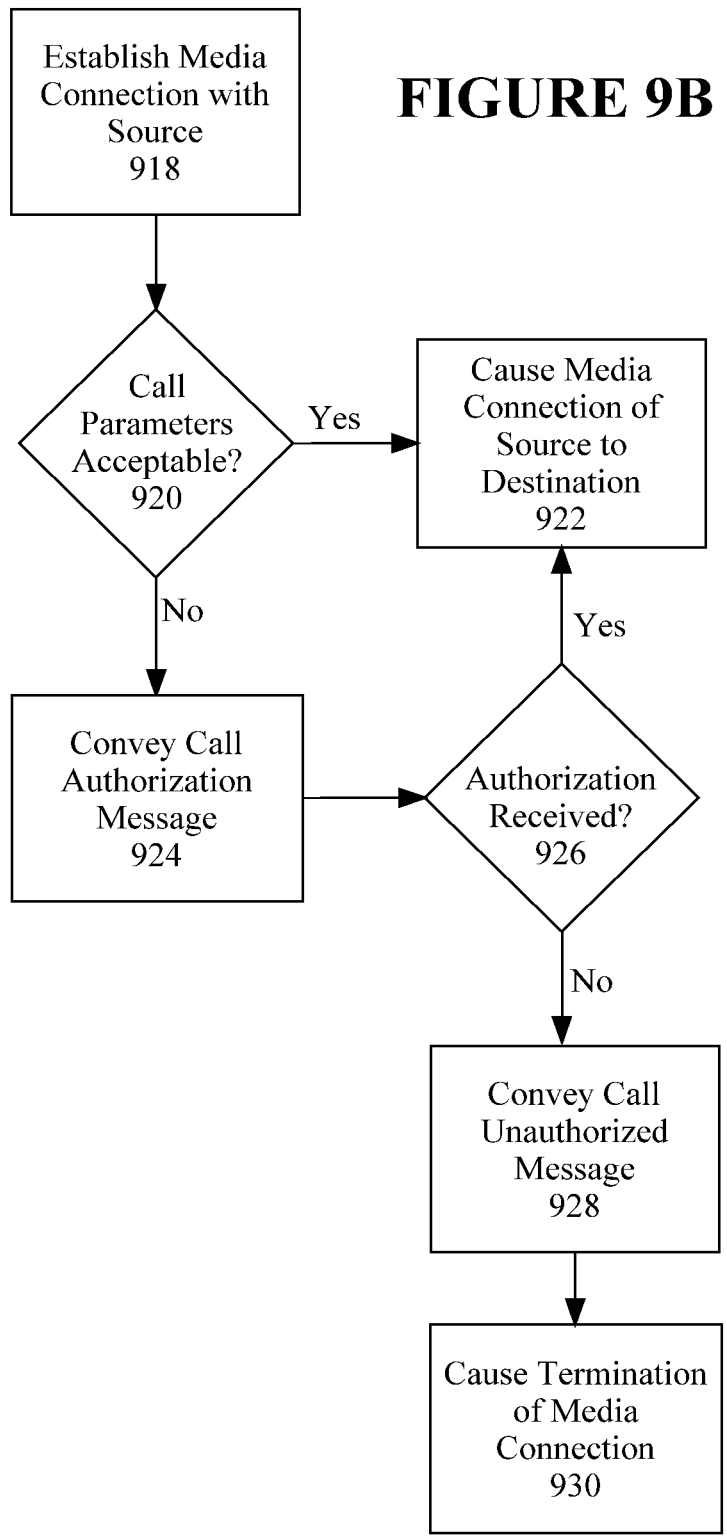
Figure 9D:
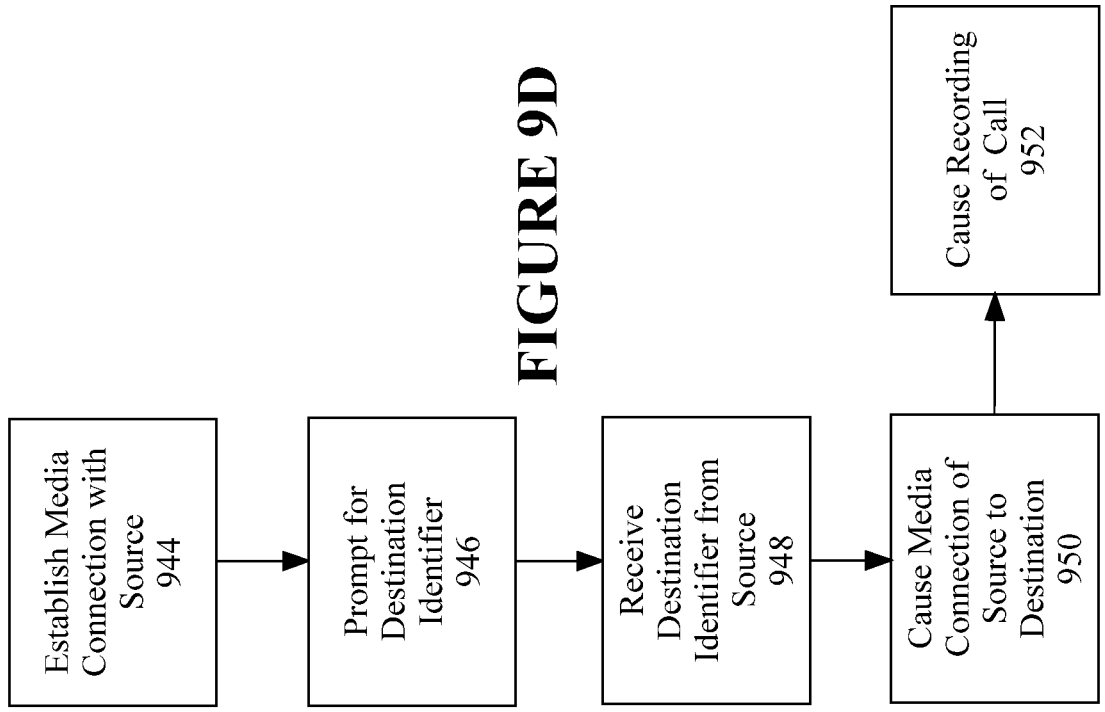
FIG. 9D is a flow chart depicting steps performed by a call processing system after a media connection has been established between a source device of the outgoing call and the call processing system as a result of logic within FIG. 8B.
Figure 9C:
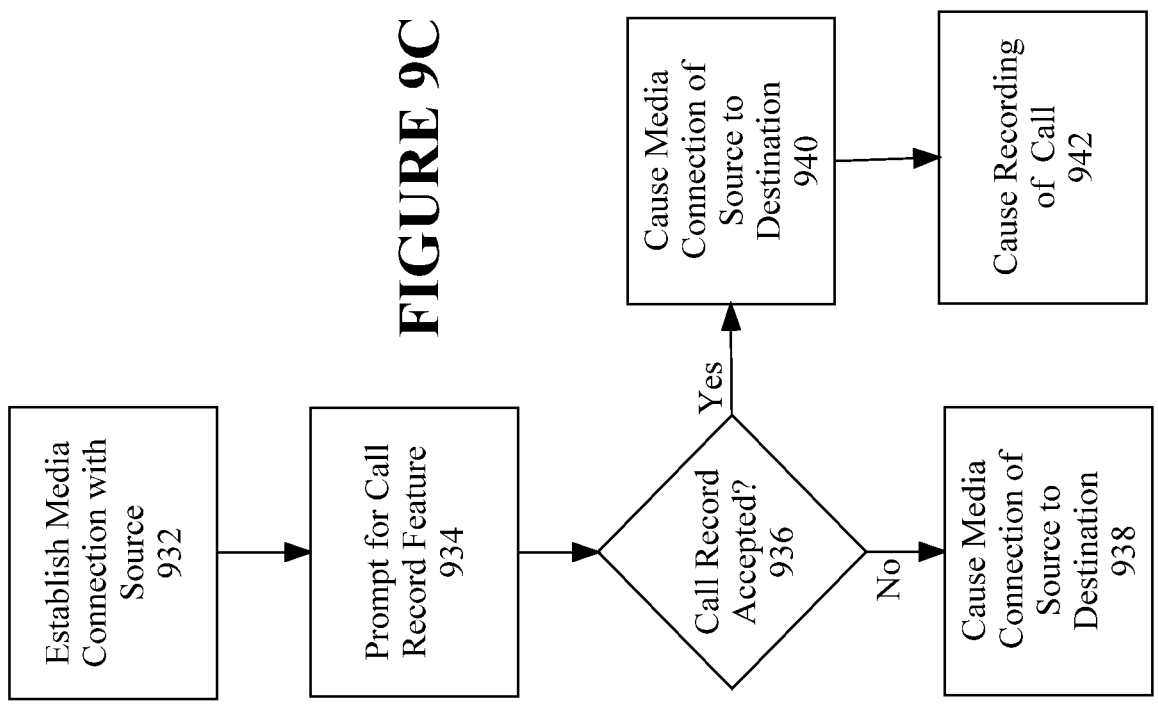

FIGS. 9A, 9B and 9C are flow charts depicting steps performed by the processing entity 202 within the call processing system 108 after a media connection has been established between the source device and the call processing system 108 as a result of the transmission of the call route message at step 808 of FIG. 8A. FIG. 9A is directed to an example implementation of the present invention in which the call feature being enabled is a customized "ring" for the user of the source device. FIG. 9B is directed to an example implementation of the present invention in which the call feature being enabled is a call restriction feature. FIG. 9C is directed to an example implementation of the present invention in which the call feature being enabled is a call record function. Each of these example implementations will be described in detail herein below.

"Modified Ring for Source" Call Feature

Within the example implementation of FIG. 9A, the processing entity 202 first establishes a media connection with the source device at step 902. Next, at step 904, the processing entity 202 conducts a look-up to determine an audio element to be conveyed to the source device prior to causing the establishment of the call. The processing entity 202 can perform the look-up on the database 204 and/or another storage entity internal or external to the call processing system 108. In some embodiments, the source identifier can be used as a reference to locate the audio element. In other embodiments, the destination identifier can be used or can be used in combination with the source identifier. In yet further embodiments, neither the source identifier nor the destination identifier is used in the look-up, but instead the audio element is selected based on service provider settings, temporal information, random selections and/or based upon another selection algorithm.

The audio element can be seen as a replacement for the standard "ring" audio that is heard by the user of the source device while waiting for the destination device to accept the call. The audio element can take many different forms in various implementations of the present invention. In some example implementations, during a provisioning stage, a subscriber of service on the source device may select an audio element from a set of potential audio elements offered by a service provider or may provide the service provider with an audio element that he/she would like to hear while waiting for the destination to accept an outgoing call. For instance, the subscriber may select/provide a particular song (ex "Kashmir" by Led Zeppelin or "Dead Puppies Are So Not Cool" by Samantha and the Cramps), a jingle (ex. seasonal melodies), elevator music, a motivational statement, a voice memo generated by the subscriber or another audio element as desired by the subscriber. In some implementations, the subscriber may select and/or provide a plurality of audio elements and the processing entity 202 may select one of these audio elements based on a random selection, a predefined ordered or another algorithm (ex. time of day).

In some implementations, the audio element(s) selected/provided by the subscriber may be stored within the database 204 or another storage entity internal or external to the call processing system 108 and may be referenced using the source identifier. In other implementations, a location identifier is stored within the database 204 or another storage entity internal or external to the call processing system 108 and may be referenced using the source identifier. The location identifier can be used to extract the audio element(s) by the processing entity 202. For example, a location identifier could comprise a URL, a lookup reference within an audio element database or another identifier that allows the processing entity 202 to locate the audio element(s) within or outside of the IP network 130.

In some alternative embodiments, the subscriber may select an audio element that is provided by an external content source; either provided in an audio stream in real time at the time of the outgoing call or static. For instance, in some implementations, the subscriber may select a radio broadcast (over the air or online); an audio portion of a television broadcast; a source for audio news; a reading of a particular website (ex. news, sports, blogs), newspaper, magazine or book; a podcast; a reading of a social media update (ex. Facebook, Twitter) or another audio element that can be extracted from a content source and conveyed to a user of the source device at the time of an outgoing call. In some implementations, a location identifier is stored within the database 204 or another storage entity internal or external to the call processing system 108 and may be referenced using the source identifier. The location identifier can be used by the processing entity 202 to extract one or more audio elements from the content source or connect to a stream of audio elements from the content source. For example, a location identifier could comprise a URL, a lookup reference within an audio element database or another identifier that allows the processing entity 202 to locate the content source within or outside of the IP network 130.

In other alternative embodiments, the processing entity 202 can generate an audio element from scheduling information associated with the subscriber of the source device after extracting the scheduling information from a calendar program associated with the subscriber. In this case, the scheduling information could be stored within the database 204 or another storage entity internal or external to the call processing system 108. In some examples, the scheduling information could be stored in a server (not shown) that runs a scheduling program, such as Outlook™ produced by Microsoft Corporation of Redmond, Wash. or Google Calendar produced by Google Inc. of Mountain View, Calif. The processing entity 202 may use the source identifier as a reference within a database, such as the database 204, to access the location and login credential information of the scheduling information. The processing entity 202 may then extract the scheduling information from the server storing the scheduling information through the IP network 130. The scheduling information, once extracted, can be used by the processing entity 202 to generate an audio element for the source device. In a particular example, the processing entity 202 could enable a text to voice function in order to create an audio element related to one or more events within the scheduling information. The processing entity 202 may use the event(s) that will occur next to create the audio element. For example, if the subscriber has a dentist appointment at 10 am on December $14^{th}$ and the user of the source device initiates an outgoing call at 9 am on December $14^{th}$, the processing entity 202 may extract scheduling information related to the dentist appointment from a scheduling program, determine that the dentist appointment is the next event within the scheduling information and generate an audio element such as "Reminder: You have a dentist appointment at 10 am today". The processing entity 202 could also determine the relative time until the event and generate an audio element such as "Reminder: You have a dentist appointment in one hour".

In further alternative embodiments, instead of using the source identifier or along with using the source identifier, the processing entity 202 can use the destination identifier to determine an audio element to convey to the source device. In some implementations, a particular destination identifier may be associated with a particular audio element. For example, a destination identifier may be linked to a reminder message, such as "David's birthday is on December $28^{th}$". The processing entity 202 may look-up the audio element in this case by using the destination identifier as a reference within the database 204 or another storage entity internal or external to the call processing system 108. In some implementations, a subscriber may enable customized audio elements for particular destination identifiers. In this case, the processing entity may utilize the source identifier to locate information associated with the subscriber within the database 204 or another storage entity internal or external to the call processing system 108 and utilize the destination identifier to locate one or more particular audio element(s) to be conveyed to the source device. For example, a subscriber may set-up one or more memo messages related to a particular individual associated with a destination identifier; link a particular destination identifier to reminder information; link a particular song, jingle, elevator music or motivation message to a particular destination identifier; or otherwise associate a particular audio element to a destination identifier. In one example, a subscriber may record a voice memo for a particular destination identifier to remind them of fact(s) concerning an individual associated with the destination identifier. In this case, the audio element may comprise "Bill does not like being called William. His wife's name is Dorothy. His son Luke plays hockey and his daughter Emma competes in diving. Bill normally orders 20 boxes of high gloss paper." As described above, the audio element(s) or location information associated with the audio element(s) may be stored within the database 204 or another storage entity internal or external to the call processing system 108.

In other embodiments, the service provider or another third party may select audio elements that are to be conveyed to the source device. In these cases, audio elements may be linked directly to the source identifier, the destination identifier or a combination of the source and destination identifiers; or may not be linked to either of the source and destination identifiers but rather may be a general audio element. In some examples, the audio elements in this case may comprise general information from the service provider (ex. service interruption information, billing information, marketing information, seasonal greeting information, public service information, etc.) or advertising information from third parties as selected by the service provider or by a third party. The advertisements, in some implementations, may be linked to information known by the service provider concerning the subscriber and/or an entity associated with the destination identifier. As described above, the audio element(s) or location information associated with the audio element(s) may be stored within the database 204 or another storage entity internal or external to the call processing system 108.

As shown in FIG. 9A, once the processing entity 202 has looked up the audio element to be conveyed to the source device at step 904, the processing entity 202 initiates the conveyance of the audio element to the source device at step 906. The conveyance of the audio element may comprise playing the audio element over the media connection with the source device. In alternative embodiments, the processing entity 202 may alternatively connect a stream of audio elements to the media connection with the source device. It should be understood that the means for conveyance of the audio element to the source device may be determined at least partially upon the audio element that is to be conveyed.

In some embodiments of the present invention, other media elements could be conveyed to the source device along with or instead of an audio element. For example, if the source device can support a screen capable of displaying visual data such as video, images and/or text (ex. multimodal phones, smart phones, computer screen associated with the source device etc.), the processing entity 202 could look-up other media elements such as video, images or text information and transmit these other media elements to the source device. In this case, a user of the source device may be able to view video, images and/or text information on a display of the source device prior to (and possibly during) the call being established between the source and destination devices. Similar to the various embodiments described, the other media elements could include information selected by a subscriber associated with the source device, information related to an entity associated with the destination identifier (ex. memos related to the entity, images/videos of the entity, etc.), information selected by a service provider or third party (ex. alert, advertisement, account information, etc.) or other data that can be visually displayed on a screen at the source device.

In some embodiments of the present invention, the processing entity 202 determines whether the audio element being conveyed has a minimum time that is required at step 908. A minimum time may be required or desired for the conveying of an audio element if particular information is required or desired to be conveyed to the user of the source device prior to the outgoing call being established with the destination device. This may be the case for audio elements such as voice memos, reminders, or other audio elements that convey information. If a minimum time is required at step 908, the processing entity 202 will wait the required minimum time at step 910. The processing entity 202 may be provided with minimum time information along with the audio element or may receive an indication that signifies that the full audio element needs to be played. It should be understood that in some embodiments, no minimum time requirement is needed and steps 908 and 910 are not implemented by the processing entity 202.

If the minimum time is not required at step 908 or if the minimum time has expired at step 910, the processing entity 202 causes the initiation of a call to the destination device using the destination identifier at step 912. The initiation of the call can be performed in many manners and will depend upon the network that the destination device is connected and the protocols the network utilizes.

After causing initiation of the call to the destination device at step 912, the processing entity waits for the destination device to answer the call at step 914. During this waiting period, when a "ring" audio would normally be provided to the source device, the processing entity 202, according to embodiments of the present invention, continues to convey the audio element(s) to the source device. If the audio element ends during this waiting period, the processing entity 202 may either convey the audio element an additional time, convey another audio element (ex. another song, ring tone) or stop conveying audio to the source device.

Once the destination device answers the call, the processing entity 202, as depicted in step 916, proceeds to terminate the conveying of the audio element and cause a media connection to be established between the source device and the desired destination device. This media connection can be established in a number of manners. In one example, the processing entity 202 causes the establishment of a media connection between the call processing system 108 and the destination device and subsequently bridges it with the already established media connection between the source device and the call processing system 108. Other techniques for the call processing system 108 to connect the source and destination devices should be understood.

Call Restriction Feature

As discussed above, FIG. 9B is directed to an example implementation of the present invention in which a call restriction feature is being enabled. For example, the call restriction feature may include, but is not limited to, a parental call control feature, a corporate policy call control feature and a toll call restriction feature. FIG. 9B depicts steps performed by the processing entity 202 within the call processing system 108 after a media connection has been established between the source device and the call processing system 108 as a result of the transmission of the call route message at step 808 of FIG. 8A. As shown, the processing entity 202 first establishes a media connection with the source device at step 918. Next, at step 920, the processing entity 202 determines whether call parameters associated with the outgoing call are acceptable. There are numerous potential call parameters that may be reviewed for acceptability including, but not limited to, the destination identifier, the toll costs associated with the outgoing call, the time of day, the day of week/month/year, or other aspects of the call that may be detectable to the processing entity 202. In example implementations, a subscriber may provision a call restriction control on a telephony service that limits outgoing calls during specific time periods (ex. when the parents are not at home 8 am to 5 pm); limits long distance calls; limits premium-rate calls; limits international calls; limits calls to specific restricted destination identifiers; and/or limits calls not to specific allowed destination identifiers. It should be understood that any call parameters could be used to limit an outgoing call depending on the desired functionality of the subscriber. Criteria for call parameters to be acceptable for the source device can be stored within the database 204 or another storage entity internal or external to the call processing system 108. The source identifier may be used as a reference to look-up the criteria for call parameters to be acceptable.

If the processing entity 202 determines that the call parameters of the outgoing call are acceptable at step 920, the processing entity 202 causes a media connection at step 922 to be established between the source device and the desired destination device. This media connection can be established in a number of manners. In one example, the processing entity 202 causes the establishment of a media connection between the call processing system 108 and the destination device and subsequently bridges it with the already established media connection between the source device and the call processing system 108. Other techniques for the call processing system 108 to connect the source and destination devices should be understood.

If the processing entity 202 determines that the call parameters of the outgoing call are not acceptable at step 920 based upon the provisioned acceptable call parameters for the source device, the processing entity 202 conveys a call authorization message to the source device at step 924. This message could take many forms. For example, the call authorization message could comprise an audio statement such as "Parental controls are enabled: Telephone calls are not allowed at this time. Please enter your PIN to remove this restriction". As should be understood, this call authorization message is just one specific example and the message could be general or specific in terms of the restrictions that have been applied and could be directed at a number of different manners in which the user of the source device could authorize the outgoing toll call. For instance, information within the call authorization message could specify what type of restriction has been applied (ex. temporal restriction, long distance restriction, premium-rate telephony service restriction, international call restriction, select set of restricted destinations, select set of allowed destinations) or could remain general. Further, the processing entity 202 could enable authorization in a number of manners including, but not limited to, authenticating a Personal Identification Number (PIN) entered by DTMF tones or interpreted with voice recognition; authenticating a password/phrase interpreted by voice recognition; authenticating a voice print of a user of the source device; authenticating biometric data of a user of the source device extracted from an offline device such as a finger print scanner or retinal scanner; or authenticating other personal data/information/biometric information that could authenticate a user of the source device. The call authorization message typically would include a prompting to the user of the source device to provide the appropriate authorization information.

In some alternative embodiments, the call authorization message could further comprise a prompt to connect with a customer service representative to change the setting or to temporarily authorize the call (ex. on a case-by case basis or for a limited amount of time or for a limited number of outgoing calls). In this case (not shown in FIG. 9B), if the user of the source device selects this option, the processing entity 202 can look-up a destination identifier associated with a customer service representative and cause a media connection between the source device and the customer service representative to be established.

As depicted in FIG. 9B at step 926, after conveying the call authorization message to the source device, the processing entity 202 determines whether authorization has been received. This determination can be achieved in numerous manners and is linked to the authorization technique that the processing entity 202 has prompted the user of the source device to utilize. For each authorization technique (ex. PIN, passcode, voice print, biometric data), the processing entity 202 can determine if it has received candidate data from the user of the source device within a predetermined period of time and subsequently whether the candidate data is valid. Valid authorization data that can be used to compare to the candidate data can be retrieved from the database 204 or another storage entity internal or external to the call processing system 108.

If the processing entity 202 does not receive proper authorization at step 926, in the example of FIG. 9B, the processing entity 202 conveys a call unauthorized message to the source device at step 928. This message could take many forms. For example, the call unauthorized message could comprise an audio statement such as "The PIN provided was not able to be authenticated. The call cannot be completed. We apologize for the inconvenience". As should be understood, this call unauthorized message could take many alternative forms and could be general or specific in nature. For instance, information within the call unauthorized message could specify why the authorization was not successful and a means to correct the situation.

In other alternative embodiments, the call unauthorized message could further comprise a prompt to connect with a customer service representative to setup, modify or disable the call restriction feature. In this case (not shown in FIG. 9B), if the user of the source device selects this option, the processing entity 202 can look-up a destination identifier associated with a customer service representative and cause a media connection between the source device and the customer service representative to be established.

As depicted in FIG. 9B at step 930, after conveying the call unauthorized message to the source device at step 928, the processing entity 202, in this example, causes the termination of the media connection. The processing entity 202 does not cause the outgoing call to be completed and a media connection is not established between the source device and the desired destination device.

If the processing entity 202 does receive proper authorization at step 926, in the example of FIG. 9B, the processing entity 202 causes a media connection at step 922 to be established between the source device and the desired destination device as described above.

Call Record Call Feature

As discussed above, FIG. 9C is directed to an example implementation of the present invention in which a call record call feature is being enabled. FIG. 9C depicts steps performed by the processing entity 202 within the call processing system 108 after a media connection has been established between the source device and the call processing system 108 as a result of the transmission of the call route message at step 808 of FIG. 8A. As shown, the processing entity 202 first establishes a media connection with the source device at step 932. Next, the processing entity 202 prompts the user of the source device to determine whether the user would like to enable the call record call feature at step 934. The processing entity 202 can initiate this prompt in a number ways. In one example implementation, the processing entity 202 conveys a call feature prompt message to the source device such as "Hello. Would you like to record this call? Please press 1 if yes. Please press 2 if no." It should be understood that the prompt could take many alternative forms and prompt the user to provide a response in various different manners including a DTMF response and/or a voice response. After providing the prompt to the user of the source device, the processing entity 202 subsequently determines if the call record feature has been accepted at step 936 by reviewing the response from the user of the source device. If no response is detected, the processing entity 202 may either presume a no response or presume a yes response, depending upon the user settings.

If the processing entity 202 determines that the call record features has not been accepted at step 936, the processing entity 202 causes a media connection at step 938 to be established between the source device and the desired destination device. This media connection can be established in a number of manners. In one example, the processing entity 202 causes the establishment of a media connection between the call processing system 108 and the destination device and subsequently bridges it with the already established media connection between the source device and the call processing system 108. Other techniques for the call processing system 108 to connect the source and destination devices should be understood.

If the processing entity 202 determines that the call record features has been accepted at step 936, the processing entity 202 also causes a media connection at step 940 to be established between the source device and the desired destination device similar to that described for step 938 but further causes recording of the call at step 942. The recording of the call can be performed in a number of different manners. In an example implementation, the processing entity 202 can initiate a call record functional element within the call processing system 108 to be a party to the call and record the audio, storing the recording within the database 204 or another storage entity internal or external to the call processing system 108. In another implementation, the processing entity 202 can bridge an additional entity within the IP network 130 into the call, the additional entity comprising a call record functional element that can record the audio of the call.

Although described above with a prompt to the user of the source device and a conditional recording based on the response from the user, in alternative implementations steps 934, 936 and 938 are removed. In this implementation, all calls initiated by a particular source identifier are recorded and therefore there is no need to prompt the user of the source device to receive acceptance.

FIG. 9D is directed to an alternative implementation of the call record call feature depicted in FIG. 9C that is triggered by the source device dialing a destination identifier assigned to the call record call feature. FIG. 9D is a flow chart depicting steps performed by the processing entity 202 within the call processing system 108 after a media connection has been established between the source device and the call processing system as a result of the transmission of the call route message at step 808 within FIG. 8B. As shown, the processing entity 202 first establishes a media connection with the source device at step 944. Next, the processing entity 202 prompts the user of the source device to determine a destination identifier associated with a desired destination device for the outgoing call at step 946. Since the user of the source device in this implementation has originally dialed a destination identifier assigned to the call record call feature and has not provided an actual desired destination identifier for the outgoing call, the processing entity 202 needs the destination identifier for the outgoing call and does not need to determines whether the user of the source device wants the call recorded as was done in FIG. 9C. The processing entity 202 can initiate the prompt for a destination identifier in a number ways. In one example implementation, the processing entity 202 conveys a destination identifier prompt message to the source device such as "Hello. Thank you for using the call record feature. Please enter or say the telephone number you would like to call?" It should be understood that the prompt could take many alternative forms and prompt the user to provide a response in various different manners including a DTMF response and/or a voice response. After providing the prompt to the user of the source device, the processing entity 202 subsequently receives the destination identifier from the source device at step 948.

Next, at step 950, the processing entity 202 causes a media connection at step 950 to be established between the source device and the desired destination device as indicated by the received destination identifier. This media connection can be established in a number of manners. In one example, the processing entity 202 causes the establishment of a media connection between the call processing system 108 and the destination device and subsequently bridges it with the already established media connection between the source device and the call processing system 108. Other techniques for the call processing system 108 to connect the source and destination devices should be understood.

As shown in FIG. 9D, the processing entity 202 causes recording of the call at step 952. The recording of the call can be performed in a number of different manners. In an example implementation, the processing entity 202 can initiate a call record functional element within the call processing system 108 to be a party to the call and record the audio, storing the recording within the database 204 or another storage entity internal or external to the call processing system 108. In another implementation, the processing entity 202 can bridge an additional entity within the IP network 130 into the call, the additional entity comprising a call record functional element that can record the audio of the call.

Broadcast Alert Feature

Figure 10:
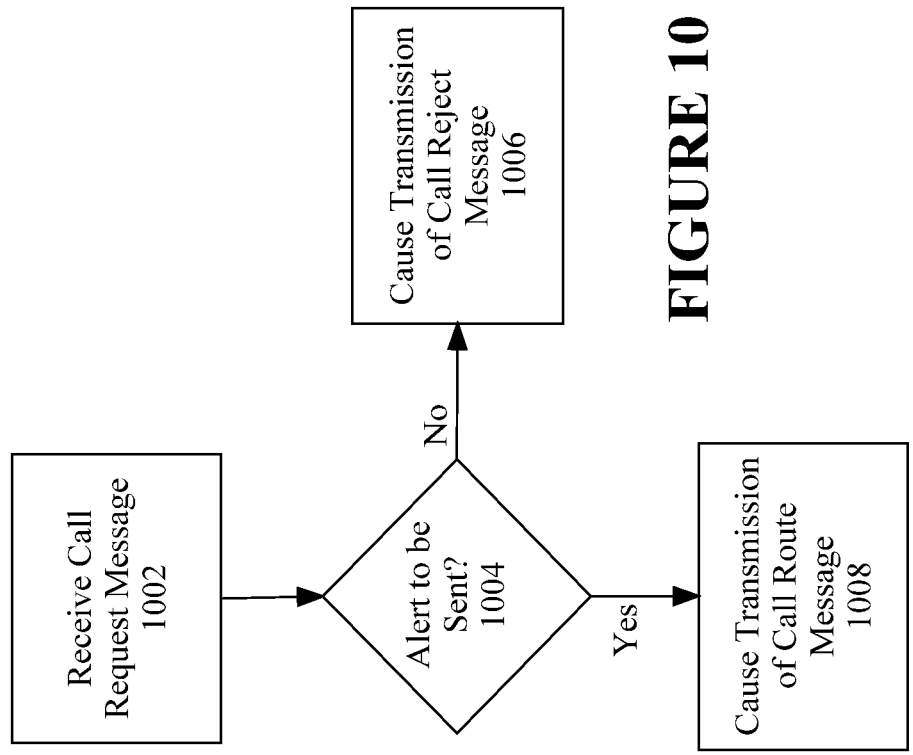
FIG. 10 is a flow chart depicting steps performed by a call processing system during signaling stages of outgoing calls that may require initiation of a broadcast alert feature according to an example implementation of the present invention.

FIG. 10 is a flow chart depicting steps performed by the processing entity 202 within the call processing system 108 during signaling stages of outgoing calls that may require initiation of a broadcast alert feature according to example implementations of the present invention. As shown in FIG. 10, the processing entity 202 receives a call request message at step 1002 similar to previously described step 402 of FIG. 4. The call request message comprises source and destination identifiers for the outgoing call. At step 1004, the processing entity 202 determines whether an alert message should be sent to the source device. This determination can be performed in a number of different manners. In one implementation, the processing entity 202 can perform a look-up within the database 204 or another storage entity internal or external to the call processing system 108 to determine whether the service provider desires to send the user of the source device an alert message. In another implementation, the processing entity 202 performs a look-up to determine whether the source device is included within a set of devices in which an alert is desired to be sent. For example, the service provider may desire to send an alert to a set of devices that are defined based on geographic location. In one specific example, an amber alert advisory for a missing child may be desired to be sent to all devices within a particular city. Other potential alerts may include, but are not limited to, weather alerts, traffic alerts, terrorism alerts, natural disaster alerts, epidemic disease alerts and other public safety alerts. In other implementations, the service provider may desire to send an alert message to all devices that it services.

If the processing entity 202 determines that an alert message is not desired to be sent to the source device, the processing entity 202 decides not to take control of the outgoing call and causes the transmission of a call reject message at step 1006, similar to the step 410 within FIG. 4. In this case, the outgoing call will be established using standard SS7 signaling techniques without control by the call processing system 108.

If the processing entity 202 determines that an alert message is desired to be sent to the source device, the processing entity 202 decides to take control of the outgoing call and causes the transmission of a call route message at step 1008, similar to the step 408 within FIG. 4. In this case, as is described in detail above, a media connection will be established between the source device and the call processing system 108. This media connection can allow the call processing system 108 to convey the desired alert message to the source device as will be described in detail with reference to FIG. 11.

Figure 11:
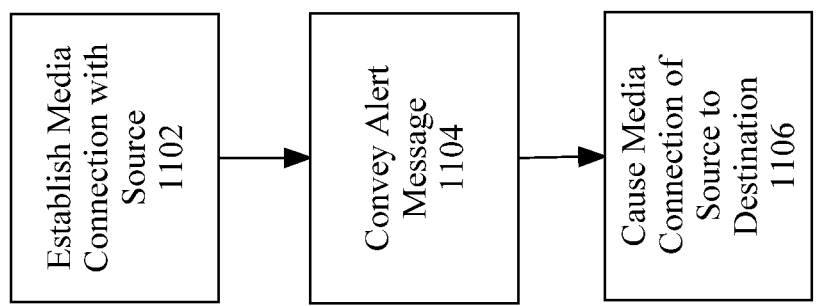
FIG. 11 is a flow chart depicting steps performed by a call processing system after a media connection has been established between a source device of the outgoing call and the call processing system as a result of logic within FIG. 10.

FIG. 11 is a flow chart depicting steps performed by the processing entity 202 within the call processing system 108 after a media connection has been established between the source device and the call processing system 108 as a result of the transmission of the call route message at step 1008 of FIG. 10. As shown, the processing entity 202 first establishes a media connection with the source device at step 1102. Next, at step 1104, the processing entity 202 conveys an alert message to the source device. This message could take many forms. For example, the alert message could comprise an audio statement such as "Environment Canada has issued a snow storm advisory for the Ottawa area. Please take appropriate precautions and drive safely." As should be understood, this alert message could take many alternative forms and could be general or specific in nature. For instance, information within the alert message could specify what type of alert has been applied (ex. weather alert, amber alert, traffic alert, terrorism alert, natural disaster alert, epidemic disease alert, other public safety alert, etc.) or could remain general. The alert message could further include notice to who issued the alert and/or what to do in response to the alert.

In some alternative embodiments, the alert message could further comprise a prompt to connect with emergency personnel if the user of the source device can help with the matter that requires the alert. For example, in the case of an amber alert, the processing entity 202 can prompt the user of the source to press a particular DTMF key if they have any information on the missing child. In this case (not shown in FIG. 11), if the user of the source device selects this option, the processing entity 202 can look-up a destination identifier associated with emergency personnel related to the alert message and cause a media connection between the source device and the appropriate emergency personnel to be established.

As depicted in FIG. 11, after conveying the alert message to the source device, the processing entity 202 at step 1106 causes a media connection to be established between the source device and the desired destination device. This media connection can be established in a number of manners. In one example, the processing entity 202 causes the establishment of a media connection between the call processing system 108 and the destination device and subsequently bridges it with the already established media connection between the source device and the call processing system 108. Other techniques for the call processing system 108 to connect the source and destination devices should be understood.

Service Provider Matter Information and Resolution Feature

Figure 12:
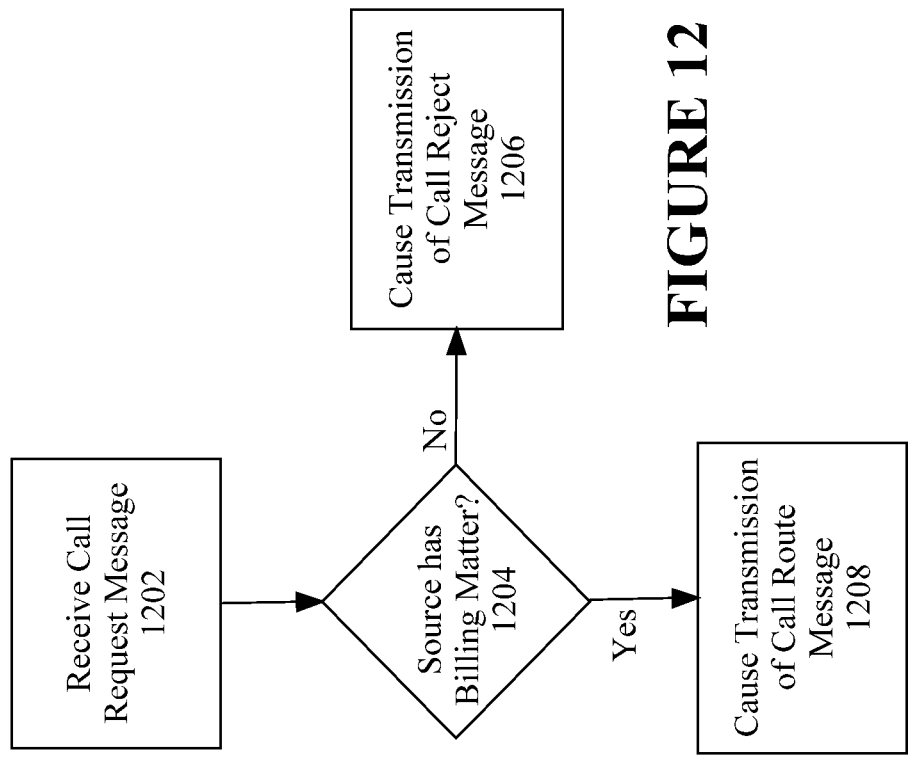
FIG. 12 is a flow chart depicting steps performed by a call processing system during signaling stages of outgoing calls that may require initiation of a service provider matter resolution feature according to an example implementation of the present invention.

FIG. 12 is a flow chart depicting steps performed by the processing entity 202 within the call processing system 108 during signaling stages of outgoing calls that may require initiation of a service provider matter information and/or resolution feature according to example implementations of the present invention. As shown in FIG. 12, the processing entity 202 receives a call request message at step 1202 similar to previously described step 402 of FIG. 4. The call request message comprises source and destination identifiers for the outgoing call. At step 1204, the processing entity 202 determines whether a service subscription associated with the source device has a service provider matter, such as a customer billing matter that should be addressed. This determination can be performed in a number of different manners. In one implementation, the processing entity 202 can perform a look-up within the database 204 or another storage entity internal or external to the call processing system 108 to determine whether the service subscription linked to the source identifier of the outgoing call has a service provider matter for which the subscriber needs to be informed and/or needs to resolve with a customer service representative. For example, service provider matters may include, but are not limited to, payment(s) that are past due, credits or debits to the customer account, status of the customer account, termination of service notices, loyalty points status, service provider policy changes, service provider pricing changes, or other matters that may be deemed important for the service provider to provide information to a subscriber.

If the processing entity 202 determines that the service subscription associated with the source device does not have a service provider matter that should be addressed, the processing entity 202 decides not to take control of the outgoing call and causes the transmission of a call reject message at step 1206, similar to the step 410 within FIG. 4. In this case, the outgoing call will be established using standard SS7 signaling techniques without control by the call processing system 108.

If the processing entity 202 determines that the service subscription associated with the source device has a service provider matter that should be addressed, the processing entity 202 decides to take control of the outgoing call and causes the transmission of a call route message at step 1208, similar to the step 408 within FIG. 4. In this case, as is described in detail above, a media connection will be established between the source device and the call processing system 108. This media connection can allow the call processing system 108 to provide information related to the service provider matter to the source device and/or connect the source device to a customer service representative as will be described in detail with reference to FIG. 13.

Figure 13:
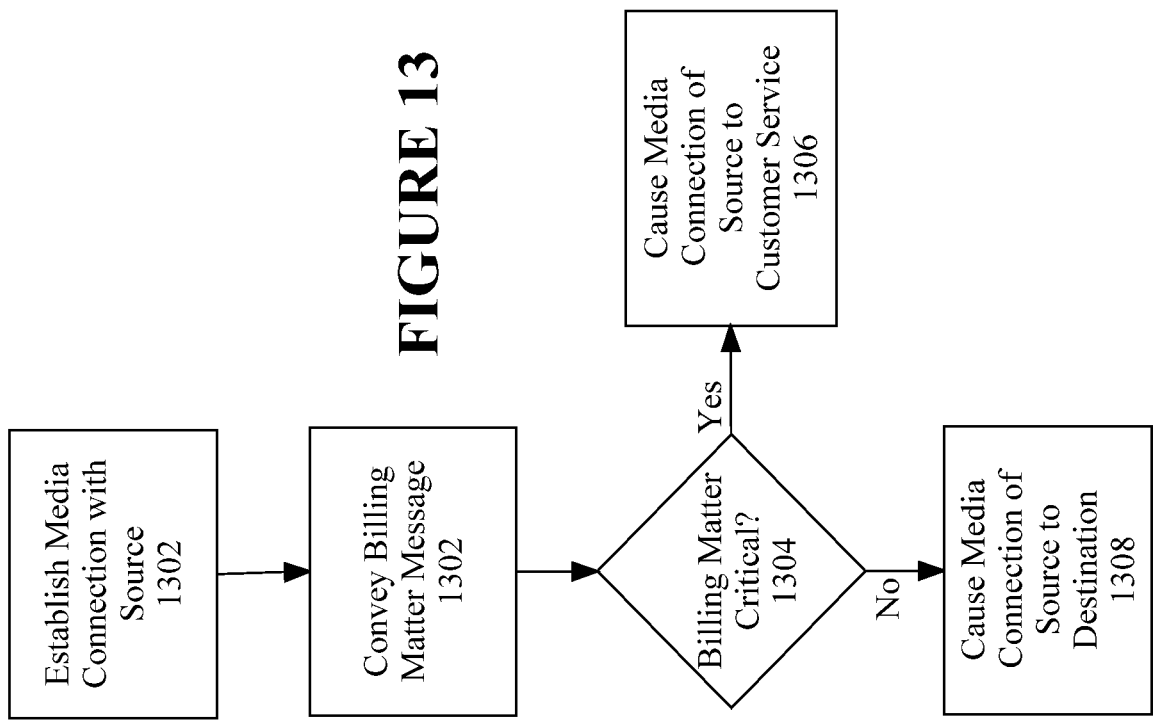
FIG. 13 is a flow chart depicting steps performed by a call processing system after a media connection has been established between a source device of the outgoing call and the call processing system as a result of logic within FIG. 12.

FIG. 13 is a flow chart depicting steps performed by the processing entity 202 within the call processing system 108 after a media connection has been established between the source device and the call processing system 108 as a result of the transmission of the call route message at step 1208 of FIG. 12. As shown, the processing entity 202 first establishes a media connection with the source device at step 1302. Next, at step 1304, the processing entity 202 conveys a service provider matter message to the source device. This message could take many forms. For example, the service provider matter message could comprise a statement such as "Your telephone bill is past due. You must make a minimum payment of $32.50 by January 27 or your telephone service will be terminated." In another example, in which the service provider matter is critical, the service provider matter message could comprise an audio statement such as "Your telephone bill is past due. As a result, you are not authorized to make telephone calls. Please stay on the line to connect with a customer service representative or please login to your account at www.bell.ca to make a payment." As should be understood, this service provider matter message could take many alternative forms and could be general or specific in nature. For instance, information within the service provider matter message could specify what type of matter is at issue (ex. payment(s) that are past due, credits or debits to the customer account, status of the customer account, termination of service notices, loyalty points status, service provider policy changes, service provider pricing changes, etc.) or could remain general. The service provider matter message could further include notice to the termination of telephone service and/or information on how to address the matter. The processing entity 202 can look-up the information used in the service provider message from the database 204 or another storage entity internal or external to the call processing system 108. In particular, the processing entity 202 can use the source identifier as a reference to look-up service provider matter information related to the service subscription associated with the source device within a service provider database.

Next, as shown within FIG. 13, the processing entity 202 determines whether the service provider matter requires action prior to establishing the outgoing call at step 1306. Various different conditions could be used to determine that a service provider matter requires action prior to establishing the outgoing call. For example, the processing entity 202 could determine that the service subscription has been past due for more than a set period of time (ex. a month) or that the service subscription is past due for an amount above a predetermined allowable threshold. Other reasons as determined by the service provider could allow the processing entity 202 to determine that a service provider matter requires action prior to establishing the outgoing call.

According to the example implementation of FIG. 13, if the processing entity 202 determines that the service provider matter requires action prior to establishing the outgoing call at step 1306, the processing entity 202 can look-up a destination identifier associated with a customer service representative that can allow the user of the source device to resolve the service provider matter and subsequently cause a media connection between the source device and the customer service representative to be established at step 1308.

If the processing entity 202 determines that the service provider matter is not critical at step 1306, the processing entity 202 causes a media connection at step 1310 to be established between the source device and the desired destination device. This media connection can be established in a number of manners. In one example, the processing entity 202 causes the establishment of a media connection between the call processing system 108 and the destination device and subsequently bridges it with the already established media connection between the source device and the call processing system 108. Other techniques for the call processing system 108 to connect the source and destination devices should be understood.

In the above example implementation, the processing entity 202 may detect that the destination identifier is an emergency identifier (ex. 911, police, fire, ambulance, etc.) or a destination identifier that does not require payment (ex. service provider identifier, government identifier, etc.). In this case, within the implementation of FIG. 12, the processing entity 202 may cause transmission of a call reject message similar to that described at step 410 of FIG. 4 and the outgoing call will be established using standard SS7 signaling techniques without control by the call processing system 108. In these cases, the example implementation of FIG. 13 would be bypassed. Alternatively, the processing entity 202 could detect that the destination identifier is an emergency identifier or a destination identifier that does not require payment after the media connection has been established between the source device and the call processing system 108 at step 1302 of FIG. 13. In this case, the processing entity 202 may bypass the steps within the implementation of FIG. 13 in order to connect the source device to the destination associated with the emergency identifier or the destination identifier that does not require payment.

Within some of the example implementations described above, media messages are described to be conveyed from the processing entity 202 to the source device. It should be understood, that these media messages may comprise audio elements (ex. specific audio statements as described) or may comprise other media elements depending upon the capabilities of the source device. For example, in implementations in which the source device can depict visual elements on a display, non-audio elements may be conveyed from the processing entity 202 to the source device along with or instead of audio elements. In some implementations, the media message may be streamed or broadcast to the source device via the media connection, though in alternative embodiments, the media message may be transferred within electronic files to the source device and subsequently audibly broadcast and/or visually displayed by the source device. It should be understood that the processing entity 202 may therefore convey the media messages to the source device in a number of manners including, but not limited to: broadcasting or causing broadcasting of the media messages to the source device and transferring or causing transferring of the media messages to the source device for display or broadcast by the source device.

Within the above description, the call processing system 108 has been described as a single system that performs signaling functionality and performs functionality after a media connection is established between it and the source device. In alternative embodiments, the system that performs the signaling functionality as described herein may be distinct to the system that performs the functionality described herein after the media connection is established with the source device. In this embodiment, the two systems may communicate with each other or may not. Further, the two systems may be operated by two distinct corporate entities in some embodiments.

Those skilled in the art will appreciate that, in some embodiments, certain functionality of a given element described herein (e.g., the processing entity 202) may be implemented as pre-programmed hardware or firmware components (e.g., application specific integrated circuits (ASICs), electrically erasable programmable read-only memories (EEPROMs), etc.) or other related components. In other embodiments, a given element described herein (e.g., the processing entity 202) may comprise a processor having access to a memory which stores program instructions for operation of the processor to implement functionality of that given element. The program instructions may be stored on a data storage medium that is fixed, tangible, and readable directly by the given element. The data storage medium may store data optically (e.g., an optical disk such as a CD-ROM or a DVD), magnetically (e.g., a hard disk drive, a removable diskette), electrically (e.g., semiconductor memory, floating-gate transistor memory, etc.), or in various other ways. Alternatively, the program instructions may be stored remotely but transmittable to the given element via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

What is claimed is:

1. A method implemented by an Internet Protocol (IP)-based call processing system for controlling an outgoing call initiated by a source device to a destination device, the source device to effect telephonic communications using a switched telephone network comprising a Service Switching Point (SSP), the method comprising:

receiving a Session Initiation Protocol (SIP) message comprising a call request message for the outgoing call from a signaling converter, the signalling converter operative to receive an SS7 message from the SSP in response to initiation of the outgoing call by the source device in the switched telephone network and to convert the SS7 message to the SIP message;

prior to establishment of a media connection between the source and destination devices, causing the SSP to initiate an audio connection between the IP-based call processing system and the source device in response to receipt of the SIP message comprising the call request message for the outgoing call;

prior to establishment of a media connection between the source and destination devices, conveying an audio element from the IP-based call processing system to the source device using the audio connection between the IP-based call processing system and the source device; and causing establishment of a media connection between the source and destination devices subsequent to the conveyance of the audio element from the IP-based call processing system and the source device.

2. A method according to claim 1, wherein causing the SSP to initiate an audio connection between the IP-based call processing system and the source device comprises causing transmission of a routing message to the SSP.

3. A method according to claim 2, wherein causing transmission of the routing message to the SSP comprises causing transmission of a second SIP message to the signaling converter that is operative to convert the second SIP message to a second SS7 message and transmit the second SS7 message to the SSP; wherein the SS7 message comprises a Transaction Capabilities Application Part (TCAP) call route message directing the outgoing call to the IP-based call processing system.

4. A method according to claim 1 further comprising determining for the outgoing call whether to initiate a call feature that requires an audio element to be conveyed to the source device prior to the establishment of the media connection between the source and destination devices; and wherein the causing the SSP to initiate an audio connection between the IP-based call processing system and the source device is further in response to a determination that a call feature that requires an audio element to be conveyed to the source device prior to the establishment of the media connection between the source and destination devices is to be initiated for the outgoing call.

5. A method according to claim 4, wherein the call feature that requires an audio element to be conveyed to the source device prior to the establishment of the media connection between the source and destination devices comprises a call restriction feature; wherein the determining whether to initiate the call feature comprises determining whether the outgoing call is a restricted call for the source device based upon at least the destination identifier; and wherein, upon determining that the outgoing call is a restricted call, a determination that the call restriction feature is to be initiated for the outgoing call is made.

6. A method according to claim 5, wherein the audio element conveyed from the IP-based call processing system to the source device comprises a call restriction message.

7. A method according to claim 1 further comprising initiating authorization of a user of the source device for the outgoing call; and wherein the causing a media connection to be established between the source and destination devices is upon successful authorization of the user of the source device.

8. A method according to claim 7, wherein the audio element conveyed from the IP-based call processing system to the source device comprises a call authorization message prompting a user of the source device to provide authorization data; and wherein the initiating authorization of the user of the source device comprises: determining whether valid authorization data is received as the authorization data from the user of the source device; and wherein successful authorization of the user of the source device occurs if valid authorization data is received.

9. A method according to claim 1 further comprising determining if a call parameter associated with the outgoing call is acceptable for the source identifier and initiating authorization of a user of the source device for the outgoing call upon determining that the call parameter is not acceptable for the source identifier; and wherein the causing a media connection to be established between the source and destination devices is upon successful authorization of the user of the source device if the call parameter is not acceptable for the source identifier.

10. A method according to claim 9, wherein the audio element conveyed from the IP-based call processing system to the source device comprises a call authorization message prompting a user of the source device to provide authorization data; and wherein the initiating authorization of the user of the source device comprises: determining whether valid authorization data is received as the authorization data from the user of the source device; and wherein successful authorization of the user of the source device occurs if valid authorization data is received.

11. A method according to claim 9, wherein the call parameter comprises at least one of a temporal parameter, a parameter associated with the destination identifier and a parameter associated with a toll associated with the outgoing call.

12. A method according to claim 1 further comprising: determining a call limitation for the outgoing call; subsequent to the causing establishment of a media connection between the source and destination devices, determining whether the call limitation has expired; and causing termination of the media connection between the source and destination devices upon determining that the call limitation has expired.

13. A method according to claim 12, wherein the audio element conveyed from the IP-based call processing system to the source device comprises a call limitation message indicating at least one aspect of the call limitation.

14. A method according to claim 13 further comprising conveying a second audio element from the IP-based call processing system to the source device using the audio connection between the IP-based call processing system and the source device upon determining that the call limitation has expired, the second audio element comprising a call termination message.

15. A method according to claim 12, wherein the call limitation comprises one of a call length limitation, an account credit limitation, a temporal limitation and a destination identifier limitation.

16. A method according to claim 5, wherein the call restriction feature comprises at least one of a toll call restriction feature, a parental call control feature and a corporate policy call control feature.

17. A method according to claim 1 further comprising terminating conveying of the audio element to the source device prior to or substantially simultaneously with the causing establishment of the media connection between the source and destination devices.

18. A method according to claim 1 further comprising determining a time period to convey the audio element and terminating conveying of the audio element to the source device in response to the time period expiring.

19. A method according to claim 1, wherein the causing establishment of a media connection between the source and destination devices comprises causing initiation of a media connection with the destination device, detecting acceptance from the destination device of the outgoing call and causing establishment of the media connection between the source and destination devices in response to the acceptance from the destination device.

20. A method according to claim 19 further comprising terminating conveying of the audio element to the source device in response to the detecting acceptance from the destination device.

21. A method according to claim 19 further comprising determining a minimum time period to convey the audio element; and wherein the causing initiation of a media connection with the destination device is in response to the minimum time period expiring.

22. A method according to claim 1 further comprising selecting one of a plurality of audio elements to convey to the source device.

23. A method according to claim 22, wherein the selecting one of the plurality of audio elements comprises selecting one of the plurality of audio elements based upon a random algorithm.

24. A method according to claim 22, wherein the selecting one of the plurality of audio elements comprises selecting one of the plurality of audio elements based upon a predetermined order.

25. A method according to claim 22, wherein the selecting one of the plurality of audio elements comprises selecting one of the plurality of audio elements based upon the destination identifier.

26. A method according to claim 1 further comprising determining an audio element from an external content source to convey to the source device using the audio connection between the IP-based call processing system and the source device.

27. A method according to claim 26, wherein the audio element from the external content source comprises one of a radio broadcast; an audio portion of a television broadcast; a source for audio news; a reading of a website, newspaper, magazine or book; a podcast; and a reading of a social media update.

28. A method according to claim 1, wherein the audio element comprises scheduling information associated with the source identifier; and the method further comprises conducting a look-up within a storage entity for the scheduling information using the source identifier.

29. A method according to claim 1 further comprising determining an audio element to convey to the source device using the source and destination identifiers.

30. A method according to claim 29, wherein the audio element comprises an audio element associated with a user of the destination device.

31. A method according to claim 30, wherein the audio element associated with the user of the destination device comprises a reminder message for a user of the source device associated with the user of the destination device.

32. A method according to claim 1 further comprising, prior to establishment of a media connection between the source and destination devices, conveying a media element to the source device via a media connection between the IP-based call processing system and the source device.

33. A method according to claim 32 further comprising determining a media element to convey to the source device.

34. A method according to claim 33, wherein the media element comprises at least one of a video element, an image element and a text element to be displayed on the source device.

35. A method according to claim 1, wherein the audio element comprises at least one of: a weather alert, an amber alert, a traffic alert, a terrorism alert, a natural disaster alert, an epidemic disease alert and a public safety alert.

36. A method according to claim 1 further comprising determining whether a service provider that enables a telephony service associated with the source identifier desires to convey an audio element to the user associated with the source identifier; and wherein the causing the SSP to initiate an audio connection between the IP-based call processing system and the source device is further in response to a determination that the service provider that enables the telephony service associated with the source identifier desires to convey an audio element to the user associated with the source identifier.

37. A method according to claim 36, wherein determining whether the service provider desires to convey an audio element to the user associated with the source identifier comprises determining whether the service provider has identified a billing matter related to the telephony service; and wherein the audio element conveyed from the IP-based call processing system to the source device comprises a message associated with the billing matter related to the telephony service.

38. An IP-based call processing system for controlling an outgoing call initiated by a source device for connection to a destination device, the source device to effect telephonic communications using a switched telephone network comprising a Service Switching Point (SSP), the system comprising:
- a processing entity operative to receive a Session Initiation Protocol (SIP) message comprising a call request message for the outgoing call from a signaling converter, the signalling converter operative to receive an SS7 message from the SSP in response to initiation of the outgoing call by the source device in the switched telephone network and to convert the SS7 message to the SIP message; and, prior to establishment of a media connection between the source and destination devices, to cause the SSP to initiate an audio connection between the IP-based call processing system and the source device in response to receipt of the SIP message comprising the call request message for the outgoing call;
- a network interface operative to establish the audio connection with the source device in response to initiation by the SSP;

wherein the processing entity is further operative, prior to establishment of a media connection between the source and destination devices, to convey an audio element from the IP-based call processing system to the source device using the audio connection between the IP-based call processing system and the source device; and to cause establishment of a media connection between the source and destination devices subsequent to the conveyance of the audio element from the IP-based call processing system and the source device.

39. A call processing system according to claim 38, wherein to cause the SSP to initiate an audio connection between the IP-based call processing system and the source device, the processing entity is operative to cause transmission of a routing message to the SSP.

40. A call processing system according to claim 39, wherein to cause transmission of the routing message to the SSP, the processing entity is operative to cause transmission of a second SIP message to the signaling converter that is operative to convert the second SIP message to a second SS7 message and transmit the second SS7 message to the SSP; wherein the second SS7 message comprises a Transaction Capabilities Application Part (TCAP) call route message directing the outgoing call to the IP-based call processing system.

41. A call processing system according to claim 38, wherein the processing entity is further operative to determine whether to initiate a call feature that requires an audio element to be conveyed to the source device prior to the establishment of the media connection between the source and destination devices for the outgoing call; and wherein the processing entity is operative to cause the SSP to initiate the audio connection between the IP-based call processing system and the source device further in response to a determination that a call feature that requires an audio element to be conveyed to the source device prior to the media connection between the source and destination devices is to be initiated for the outgoing call.

42. A call processing system according to claim 41, wherein the call feature that requires an audio element to be conveyed to the source device prior to the establishment of the media connection between the source and destination devices comprises a call restriction feature; and wherein to determine whether to initiate the call feature for the outgoing call, the processing entity is operative to determine whether the outgoing call is a restricted call for the source device based upon at least the destination identifier; and wherein, upon determining that the outgoing call is a restricted call, the processing entity is operative to make a determination that the call restriction feature is to be initiated for the outgoing call.

43. A call processing system according to claim 42, wherein the audio element conveyed from the IP-based call processing system to the source device comprises a call restriction message.

44. A call processing system according to claim 38 wherein the processing entity is operative, prior to establishment of a media connection between the source and destination devices, to determine a media element to convey to the source device and to initiate conveying of the media element to the source device via a media connection between the IP-based call processing system and the source device.

45. A call processing system according to claim 44, wherein the media element comprises at least one of a video element, an image element and a text element to be displayed on the source device.

46. A call processing system according to claim 38, wherein the processing entity is operative to determine if a call parameter associated with the outgoing call is acceptable for the source identifier and to initiate authorization of a user of the source device for the outgoing call upon determining that the call parameter is not acceptable for the source identifier; and wherein the processing entity is operative to cause a media connection to be established between the source and destination devices upon successful authorization of the user of the source device if the call parameter is not acceptable for the source identifier.

47. A call processing system according to claim 38, wherein the processing entity is operative to determine a call limitation for the outgoing call; and, subsequent to establishment of the media connection between the source and destination devices, the processing entity is operative to determine whether the call limitation has expired and to cause termination of the media connection between the source and destination devices upon determining that the call limitation has expired.

48. A call processing system according to claim 38, wherein the processing entity is operative to terminate conveying of the audio element to the source device prior to or substantially simultaneously with the causing establishment of the media connection between the source and destination devices.

49. A call processing system according to claim 38, wherein the processing entity is operative to determine a time period to convey the audio element and to terminate conveying of the audio element to the source device in response to the time period expiring.

50. A call processing system according to claim 38, wherein, to cause establishment of a media connection between the source and destination devices, the processing entity is operative to cause initiation of a media connection with the destination device, to detect acceptance from the destination device of the outgoing call and to cause establishment of the media connection between the source and destination devices in response to the acceptance from the destination device.

51. A call processing system according to claim 38, wherein the processing entity is operative to select one of a plurality of audio elements to convey to the source device.

52. A call processing system according to claim 38, wherein the processing entity is operative to determine an audio element from an external content source to convey to the source device using the audio connection between the IP-based call processing system and the source device.

53. A call processing system according to claim 38, wherein the audio element comprises scheduling information associated with the source identifier; and wherein the processing entity is operative to conduct a look-up within a storage entity for the scheduling information using the source identifier.

54. A call processing system according to claim 38, wherein the processing entity is operative to determine an audio element to convey to the source device using the source and destination identifiers.

55. A call processing system according to claim 38, wherein the processing entity is operative to determine whether a service provider that enables a telephony service associated with the source identifier desires to convey an audio element to the user associated with the source identifier; and wherein the processing entity is operative to cause the SSP to initiate an audio connection between the IP-based call processing system and the source device in response to a determination that the service provider that enables the telephony service associated with the source identifier desires to convey an audio element to the user associated with the source identifier.

56. Non-transitory computer-readable media containing a program element executable by an IP-based call processing system to perform a method for controlling an outgoing call initiated by a source device to a destination device, the source device to effect telephonic communications using a switched telephone network comprising a Service Switching Point (SSP), the program element comprising:
   first program code for receiving a Session Initiation Protocol (SIP) message comprising a call request message for the outgoing call from a signaling converter, the signalling converter operative to receive an SS7 message from the SSP in response to initiation of the outgoing call by the source device in the switched telephone network and to convert the SS7 message to the SIP message;
   second program code for, prior to establishment of a media connection between the source and destination devices, causing the SSP to initiate an audio connection between the IP-based call processing system and the source device in response to receipt of the SIP message comprising the call request message for the outgoing call;
   third program code for, prior to establishment of a media connection between the source and destination devices, conveying an audio element from the IP-based call processing system to the source device using the audio connection between the IP-based call processing system and the source device; and
   fourth program code for causing establishment of a media connection between the source and destination devices subsequent to the conveyance of the audio element from the IP-based call processing system and the source device.

57. A call processing system according to claim 38, wherein the processing entity is operative to initiate authorization of a user of the source device for the outgoing call; and wherein the processing entity is operative to cause a media connection to be established between the source and destination devices upon successful authorization of the user of the source device.

58. A call processing system according to claim 57, wherein the audio element conveyed from the IP-based call processing system to the source device comprises a call authorization message prompting a user of the source device to provide authorization data; and wherein, to initiate authorization of the user of the source device, the processing entity is operative to determine whether valid authorization data is received as the authorization data from the user of the source device; and wherein successful authorization of the user of the source device occurs if valid authorization data is received.

59. A call processing system according to claim 46, wherein the audio element conveyed from the IP-based call processing system to the source device comprises a call authorization message prompting a user of the source device to provide authorization data; and wherein, to initiate authorization of the user of the source device, the processing entity is operative to determine whether valid authorization data is received as the authorization data from the user of the source device; and wherein successful authorization of the user of the source device occurs if valid authorization data is received.

60. A call processing system according to claim 46, wherein the call parameter comprises at least one of a temporal parameter, a parameter associated with the destination identifier and a parameter associated with a toll associated with the outgoing call.

61. A call processing system according to claim 47, wherein the audio element conveyed from the IP-based call processing system to the source device comprises a call limitation message indicating at least one aspect of the call limitation.

62. A call processing system according to claim 61, wherein the processing entity is operative to convey a second audio element from the IP-based call processing system to the source device using the audio connection between the IP-based call processing system and the source device upon determining that the call limitation has expired, the second audio element comprising a call termination message.

63. A call processing system according to claim 47, wherein the call limitation comprises one of a call length limitation, an account credit limitation, a temporal limitation and a destination identifier limitation.

64. A call processing system according to claim 50, wherein the processing entity is operative to terminate conveying of the audio element to the source device in response to the detecting acceptance from the destination device.

65. A call processing system according to claim 50, wherein the processing entity is operative to determine a minimum time period to convey the audio element; and wherein the processing entity is operative to cause initiation of a media connection with the destination device in response to the minimum time period expiring.

66. A call processing system according to claim 51, wherein the processing entity is operative to select one of the plurality of audio elements based upon a random algorithm.

67. A call processing system according to claim 51, wherein the processing entity is operative to select one of the plurality of audio elements based upon a predetermined order.

68. A call processing system according to claim 51, wherein the processing entity is operative to select one of the plurality of audio elements based upon the destination identifier.

69. A call processing system according to claim 54, wherein the audio element comprises an audio element associated with a user of the destination device.

70. A call processing system according to claim 69, wherein the audio element associated with a user of the destination device comprises a reminder message for a user of the source device associated with the user of the destination device.

71. A call processing system according to claim 55, wherein, to determine whether the service provider desires to convey an audio element to the user associated with the source identifier, the processing entity is operative to determine whether the service provider has identified a billing matter related to the telephony service; and wherein the audio element conveyed from the IP-based call processing system to the source device comprises a message associated with the billing matter related to the telephony service.

* * * * *